US007608949B2

(12) United States Patent
Busch

(10) Patent No.: US 7,608,949 B2
(45) Date of Patent: Oct. 27, 2009

(54) SLIDING DOOR COMPRISING A MAGNETIC SUPPORT AND/OR DRIVE SYSTEM COMPRISING A ROW OF MAGNETS

(75) Inventor: Sven Busch, Dortmund (DE)

(73) Assignee: Dorma GmbH + Co. KG, Ennepetal (DE)

( * ) Notice: Subject to any disclaimer, the term of this patent is extended or adjusted under 35 U.S.C. 154(b) by 57 days.

(21) Appl. No.: 11/665,618

(22) PCT Filed: Oct. 8, 2005

(86) PCT No.: PCT/EP2005/010851

§ 371 (c)(1),
(2), (4) Date: Jun. 4, 2007

(87) PCT Pub. No.: WO2006/040098

PCT Pub. Date: Apr. 20, 2006

(65) Prior Publication Data

US 2008/0100152 A1 May 1, 2008

(30) Foreign Application Priority Data

Oct. 17, 2004 (DE) ....................... 10 2004 050 328
Oct. 17, 2004 (DE) ....................... 10 2004 050 341

(51) Int. Cl.
*H02K 41/02* (2006.01)

(52) U.S. Cl. .......................................... 310/14; 310/12

(58) Field of Classification Search .................. 310/12, 310/13-14, 156.38; 318/135
See application file for complete search history.

(56) References Cited

U.S. PATENT DOCUMENTS 4,641,065 A * 2/1987 Shibuki et al. .............. 318/135
4,912,746 A 3/1990 Oishi
5,134,324 A * 7/1992 Sakagami et al. ............. 310/12
5,214,323 A 5/1993 Ueda (Continued)

FOREIGN PATENT DOCUMENTS

DE 40 16 948 11/1991

(Continued)

OTHER PUBLICATIONS

Search Report dated Jan. 2, 2006 for the underlying International Application No. PCT/EP2005/010851.

*Primary Examiner*—Michael C Zarroli
(74) *Attorney, Agent, or Firm*—Cohen Pontani Lieberman & Pavane LLP

(57) ABSTRACT

A magnetic drive system for driving a door leaf in a driving direction is disclosed. The drive system includes a row of magnets disposed in the driving direction and having a longitudinal direction, the magnets being arranged so that magnetizations of the magnets reverse in accordance with a predetermined pattern; and a coil arrangement comprising a plurality of coil cores and a plurality of coils, the coils being wound around respective coil cores and spaced apart from each other in the longitudinal direction of the row of magnets. When energized, the coils interact with the magnets to generate a thrust force for driving the door leaf in the driving direction. The magnets in the row of magnets are disposed relative to the coil cores so that a total magnetization of the magnets has no abrupt polarity reversal in the driving direction with respect to the coil cores.

35 Claims, 20 Drawing Sheets

U.S. PATENT DOCUMENTS

| | | | | |
|---|---|---|---|---|
| 5,712,516 | A | 1/1998 | Kabout | |
| 6,265,793 | B1 * | 7/2001 | Korenaga | 310/12 |
| 6,357,359 | B1 * | 3/2002 | Davey et al. | 104/282 |
| 6,469,406 | B1 * | 10/2002 | Hwang et al. | 310/12 |
| 6,750,570 | B1 * | 6/2004 | Grehant | 310/12 |
| 6,791,214 | B2 | 9/2004 | Korenaga | |
| 6,906,789 | B2 * | 6/2005 | Carter et al. | 355/75 |
| 6,949,846 | B2 | 9/2005 | Sugita | |
| 2004/0256918 | A1 | 12/2004 | Beakley | |
| 2005/0134122 | A1 | 6/2005 | Uchida | |
| 2005/0236912 | A1 | 10/2005 | Beakley | |

FOREIGN PATENT DOCUMENTS

| | | |
|---|---|---|
| DE | 196 18 518 | 3/1998 |
| JP | 08-275493 | 10/1996 |
| WO | WO 94/13055 | 6/1994 |
| WO | WO 00/50719 | 8/2000 |

* cited by examiner

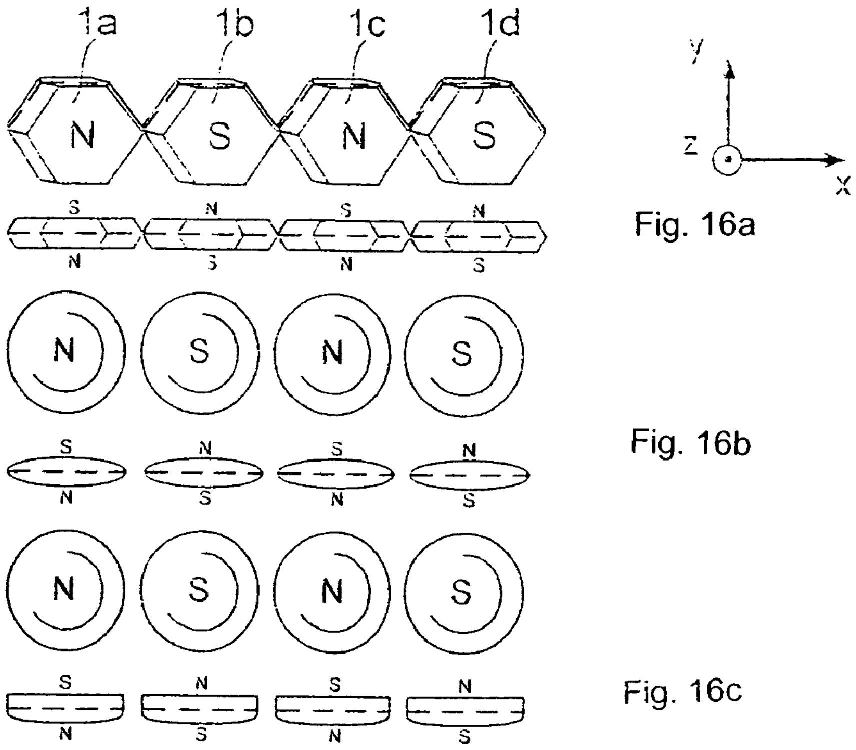
Fig. 16a
Fig. 16b
Fig. 16c
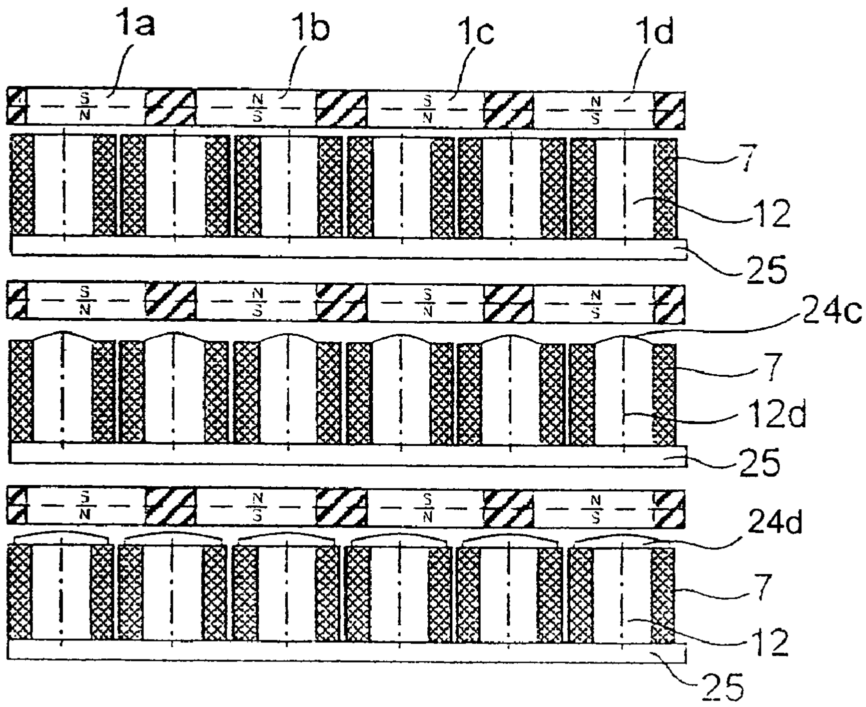
Fig. 17a
Fig. 17b
Fig. 17c

SLIDING DOOR COMPRISING A MAGNETIC SUPPORT AND/OR DRIVE SYSTEM COMPRISING A ROW OF MAGNETS

CROSS-REFERENCE TO RELATED APPLICATIONS

This is a U.S. national stage of International Application No. PCT/EP2005/010851, filed on 8 Oct. 2005. Priority is claimed on German Application Nos. 10 2004 050 341.9 and 10 2004 050 328.1, both filed on 17 Oct. 2004.

BACKGROUND OF THE INVENTION

1. Field of the Invention

The invention relates to a sliding door with a magnetic carrying and/or drive system with a permanently excited magnetic carrying device and a linear drive unit with at least one row of magnets, in particular for an automatically operated door. The term “row of magnets” includes oblong individual magnets as well. The row of magnets can be stationary or non-stationary.

2. Description of the Related Art

A sliding door guide is known from DE 40 16 948 A1, wherein, under normal load, magnets interacting with one another effect a contact-free floating guidance of a door leaf or the like, which leaf is maintained in a sliding guide, in addition to the stationary disposed magnets in the sliding guide, a stator of a linear motor being provided, the rotor thereof being disposed at the sliding door. On account of the selected V-shaped disposition of the permanent magnets of the disclosed permanently excited magnetic carrying device, a laterally stable guiding path can not be realized, hence a relatively complicated disposition and embodiment of stator and rotor are required. This arrangement raises the price of the such a sliding door guide considerably.

A combined support and drive system for an automatically operated door is known from WO 00/50719 A1, wherein a permanently excited magnetic carrying system is symmetrically designed and has stationary and non-stationary rows of magnets, which are respectively disposed in one plane, the carrying system being in an unstable equilibrium, and wherein the carrying system has symmetrically disposed lateral guiding elements, which may have roller-shaped supports. The laterally stable guiding path thus achieved results in a simple development and disposition of stator and rotor of a linear motor accommodated in a common housing, namely the option of being able to arbitrarily dispose the stator and the rotor of the linear motor in relation to the carrying system and of experiencing no limitations by the carrying system as to the shape of stator and rotor.

These two support systems have in common that they function according to the principle of repulsive forces, which principle of action allows for a stable poise without requiring an expensive electrical control device. However, the drawback therein is that both at least one stationary and at least one non-stationary row of magnets need to be provided, i.e. magnets need to be disposed along the whole path of the sliding guide or of the bearing of the automatically operated door and at the carrying slide for the door, which slide is movable along this guide, thus making the production of such system very costly, which on the other hand, is characterized by an extremely soft-running and silent operation and is almost wear-free and maintenance free, as the mechanical friction necessary for carrying the door has been obviated.

Another electromagnetic drive system for magnetic floating and carrying systems is known from DE 196 18 518 C1, wherein a stable floating and carrying state is achieved through an appropriate disposition of a permanent magnet and ferromagnetic material. For this purpose, the permanent magnet brings the ferromagnetic material in a state of partial magnetic saturation. Electromagnets are disposed such that the permanent magnets are moved exclusively by changing the saturation in the carrying rail, and the coil cores are included in the permanent magnetic partial saturation, which results in the floating and carrying state.

WO 94/13055 further shows a stator drive for an electric linear drive and a door, which is equipped with such a stator and suspended by means of magnets from the door lintel of a frame. For this purpose, several magnets or groups of magnets are disposed at the door panel, their magnetic field strength being so important that an attractive force to a guiding plate disposed at the underside of the door lintel is achieved, whereby this attractive force is sufficient to lift the weight of the door panel.

On account of the selected dispositions of the magnetic support and/or the magnetic drive, the forces to be overcome in all these systems for starting acceleration need to be greater than those, which have to applied for continuing the motion of the moving door, and the force required for displacement along the travel path is “rippled”.

SUMMARY OF THE INVENTION

Therefore, it is an object of the invention to further develop a sliding door with a combined magnetic carrying and/or drive system comprising a permanently excited magnetic carrying device and a linear drive unit for at least one door leaf with at least one row of magnets, in order to maintain the above mentioned advantages, however, at low production cost, and to improve the smooth running in particular.

This problem is solved with the following embodiments of the invention. Advantageous features of the embodiments of the invention will become apparent from the following discussion.

A first alternative development of an inventive sliding door with a magnetic drive system for at least one door leaf, with a linear drive unit, which has at least one row of magnets disposed in driving direction, the magnetization thereof reversing the sign in its longitudinal direction at certain intervals, and at least one coil arrangement consisting of several individual coils, which are spaced apart from each other in longitudinal direction of the row of magnets, which coil arrangement, by appropriate activation of the individual coils, causes an interaction with the at least one row of magnets generating advance forces, wherein a total magnetization of the at least one row of magnets has no abrupt sign reversals with regard to the coil cores of the coil arrangement in driving direction, has the advantage compared to the state of the art that the linear drive unit is reduced in cogging force. In such a combination, on account of a cogging force reduction of the row of magnets, in addition to the linear drive unit, a preferably provided permanently excited magnetic carrying device can be reduced in cogging force as well, if the permanently excited magnetic carrying device and the linear drive unit are formed integrally. The inventive reduction of the cogging force will achieve both, improve the starting acceleration and decrease the “ripple” of the force required to move the carrying device.

The inventive total magnetization of the at least one row of magnets in driving direction, which has no abrupt sign reversals, thus, on account of the thereby reduced cogging force, will allow for manually moving the door leaf effortless and smoothly when the drive is switched off, whereby e.g. an escape route function can be realized without any problem. In automatic operation, the electromagnetic thrust forces are not superimposed with important cogging force, whereby a uniform total thrust force is achieved such that a uniform smooth movement results at a slower travel speed, and very slow speeds can be realized.

For this purpose, according to the invention, the magnetizations of the at least one row of magnets are preferably irregular with regard to the coil arrangement, or adjusted such that, as a result, there is a continuous or almost continuous transition from one sign to an adjacent reversed sign. According to the invention, it is intended that the alternating polarizations of the at least one row of magnets have a "soft" transition, whereby it is possible to adjust such a soft transition by avoiding a steadily repeated raster of the individual magnets rigidly connected to each other with regard to the coil cores of the coil arrangement rigidly connected to each other, thus providing for certain intended or, within certain limits, random deviations from the raster, which normally is regularly adjusted for the linear drive. For realizing this feature, it is further preferred that the magnetizations of the at least one row of magnets are spaced apart irregularly and the individual coils are regularly spaced apart from each other, as a particularly good combination with further measures reducing cogging forces is thus possible. According to this preferred embodiment of the invention, the coil cores of the individual coils as well may have an irregular distance to each other. In this case, the magnets can be placed at a regular distance or at another irregular distance to each other.

Alternatively or additionally, individual magnets, according to the invention, may have a skewed shape or may be installed at a slant with regard to the driving direction. Such developed individual magnets easily allow the transitions to be designed more continuous between the respectively generated magnetic fields or between the elements introduced into these fields and the ambient air.

According to a second preferred embodiment according to the first alternative of the invention, which can be realized alternatively or additionally to the first preferred embodiment of the first alternative of the invention, the magnetizations of parallel rows of magnets and/or of groups of respective adjacent individual magnets of a row of magnets and/or of individual magnets of a row of magnets can be offset towards each other with regard to the distances of the individual coils of the coil arrangement, in particular of the magnetic cores thereof. The above described effect likewise occurs hereby, as the rows of magnets are rigidly connected to each other.

In this second preferred embodiment, preferably the magnetizations of two parallel rows of magnets are offset towards each other by ½ with regard to the individual coils of the coil arrangement, if 1 is one wavelength of a cogging force arising along the travel path of one single row of magnets. Hereby, the cogging forces of the two rows of magnets at least almost neutralize each other under ideal circumstances. Just an irregular portion of cogging forces remains, which can be further reduced by the measures of the first preferred embodiment.

Alternatively, for achieving the same effect, the magnetizations of two groups of individual magnets of a row of magnets could be offset by ½ towards each other and with regard to the individual coils of the coil arrangement, if 1 is the wavelength of a cogging force arising along the travel path of one single group.

As another alternative or as an additional development, individual magnets of a row of magnets, which are alternatingly polarized in longitudinal direction of the row of magnets, or groups of at least two such individual magnets of a row of magnets, can be slightly offset towards each other and with regard to the individual coils of the coil arrangement, a maximum offset of an individual magnet or of a group of individual magnets being 1, if 1 is the wavelength of the cogging force in individual magnets or groups of individual magnets not being offset towards each other. In particular in case of a plurality of groups or individual magnets offset towards each other and with regard to the basic raster, this disposition with a maximum offset of 1 results in a superimposition, which in turn results in a cancellation even of irregular cogging forces.

The second alternative development of the inventive sliding door, with a magnetic carrying and/or drive system for at least one door leaf, has a reduced cogging force linear drive unit, which has at least one row of soft-magnetic or hard-magnetic elements disposed in driving direction and at least one coil arrangement consisting of several individual coils, which, by appropriate activation of the individual coils, causes an interaction with the at least one row of soft-magnetic or hard-magnetic elements generating advance forces, and/or a permanently excited magnetic carrying device, which has at least one cogging force reduced row of magnets, at least one soft-magnetic or hard-magnetic carrying element being in action of attractive force with at least one of the at least one row of magnets, with a guiding element, which guarantees a certain gap-shaped distance between the at least one row of magnets and the carrying element, the at least one row of magnets being possibly formed by the at least one row of hard-magnetic elements disposed in driving direction. Compared to the state of the art, this inventive magnetic carrying and/or drive system has the advantage that the linear drive unit and/or the row of magnets of the magnetic carrying device is reduced in cogging force. In such a combination, on account of the cogging force reduction of the row of magnets, both, the permanently excited magnetic carrying device and the linear drive unit may be reduced in cogging force, if the permanently excited magnetic carrying device and the linear drive unit are formed integrally. The inventive reduction of the cogging force will achieve both, improve the starting acceleration and decrease a "ripple" of the force required to move the carrying device.

Generally, according to the invention, for achieving the cogging force reduction, the soft-magnetic or hard-magnetic elements, which also in the first alternative development can form the row of magnets, are preferably skewed. Alternatively or additionally, according to the invention, the soft-magnetic or hard-magnetic elements preferably may have a chamfer or an arched surface. Such physical developments of the soft-magnetic or hard-magnetic elements allow the transitions to be designed more continuous between the respectively generated magnetic fields or between the elements introduced into these fields and the ambient air, as the respective element has less material at the edges.

Alternatively or additionally, according to the invention, the soft-magnetic or hard-magnetic elements may be multipolar magnets with four or more magnetic poles and/or they may have an irregular magnetization with a weakening towards the edges. According to the above mentioned change in the dimensions of the soft-magnetic or hard-magnetic elements, more continuous transitions between a respective element and its ambient air will be generated by means of these developments as well.

As another alternative or an additional development for reducing the cogging force, at least two rows of soft-magnetic or hard-magnetic elements may be provided in driving direction, which are offset with regard to each other in driving direction. Hereby, in particular the "ripple" of the required force for moving a carrying slide supported by the inventive carrying and/or drive system is decreased, the effect of a lower cogging force being thus achieved as well.

A similar effect occurs likewise in the further, alternative or additional inventive option, wherein the soft-magnetic or hard-magnetic elements are irregularly spaced apart from each other in driving direction. Alternatively to these developments of the soft-magnetic or hard-magnetic elements, according to the invention, annular or lateral pole shoes can be provided at the individual coils, which conduct electromagnetic fields respectively generated by the individual coils to the of soft-magnetic or hard-magnetic elements disposed in a row, whereby a face of the pole shoes oriented towards the soft-magnetic or hard-magnetic elements disposed in a row is arched or provided with a chamfer.

Alternatively or additionally, according to the invention, it can be provided that the individual coils have coil cores, whereby a surface of the coil cores oriented towards the soft-magnetic or hard-magnetic elements disposed in a row is arched or provided with a chamfer.

Further, alternatively or additionally, for reducing the cogging force, flux conducting elements can be mounted at surfaces of the individual coils oriented towards the soft-magnetic or hard-magnetic elements disposed in a row, which change or enlarge said surfaces. These flux conducting elements may be preferably skewed, rounded, bent or provided with a chamfer.

Through these above described measures as well, namely to weaken the magnetic fields produced by the individual coils through slight modifications of the edge areas of the predetermined coil cores, the cogging force that they are generating will be reduced, as well as the cogging force of the row of hard-magnetic elements acting upon these coil cores, because these have less material at their transitions to the ambient air.

According to the invention, the cogging force can be decreased through special coils to magnets ratios. In particular, according to the invention, it is preferred that over a total width of "x" individual coils, with an arrangement with "n" electrical phases, "y" magnets, with "p" magnetic poles are distributed regularly, whereby: n=x=3 and p=y=4 or n=x=5 and p=y=4, or n=x=5 and p=y=6, or n=x=5 and p=y=8, or n=x=6 and p=y=4, or n=x=8 and p=y=10.

Furthermore, alternatively or additionally, the cross-sectional area of the coil cores of the individual coils can be embodied specifically to reduce the cogging force. In particular, the coil cores preferably may have a round cross-sectional area, or a diameter of the coil cores may be greater than a height of the elements of the at least one row of soft-magnetic or hard-magnetic elements disposed in driving direction. Alternatively or additionally, the coil cores may have a rectangular or square cross-sectional area, which is preferably provided with a rounding or a chamfer at the edges. Furthermore, alternatively or additionally, the individual coils may have coil cores with a cross-sectional area, which is composed of a rectangular, particularly square area and of two semicircles or roundings. The individual coils according to the invention may have coil cores with an oval or an oval-like cross-sectional area, to reduce the cogging force.

The inventively used magnetic carrying system or the combined magnetic carrying and drive system with a permanently excited carrying device, compared to the state of the art described above, has the advantage that, on account of the utilized action of attractive force, the carrying element does not need to be necessarily hard-magnetic. As, in addition, a guiding element is provided, which guarantees a distance between the at least one row of magnets and the carrying element, no electrical nor electronic control device needs to be provided, although an unstable state of equilibrium is utilized. Furthermore, by utilizing the at least one row of magnets for both for carrying and for the advance, the manufacturing costs and the required construction space are reduced.

In the inventively used combined magnetic carrying and/or drive system, preferably the at least one row of magnets is magnetized perpendicular to the carrying direction and to the driving direction, in which a panel, e.g. a sliding door panel, carried by the carrying device can be displaced. In this preferred disposition of the magnetization of the at least one row of magnets perpendicular to the carrying direction, a particularly simply structured development of the guiding element is achieved, as the latter can be designed and embodied in this case independently from a force, which has to be generated by the carrying device in order to maintain the carried panel in a floating state. Furthermore, a simple embodiment of the linear drive unit is possible, because it can be likewise designed and embodied independently from the force to be generated by the carrying device.

According to the invention, the at least one row of magnets preferably consists of individual permanent magnets, because lining up individual smaller magnets allows to cut back on costs, when purchasing material and thus during the production process of the inventive carrying device. Furthermore, this development allows more readily to compensate tolerances and to better utilize the magnetic properties. Instead of a row of magnets, an individual magnet can be used, thus eliminating the complicated mounting of the plurality of individual magnets.

According to the invention, the magnetization of the at least one row of magnets preferably reverses the sign at certain intervals in a longitudinal direction of the at least one row of magnets. This feature, which is particularly easy to realize in a row of magnets consisting of individual permanent magnets, achieves a better magnetic effect, because, together with the carrying device, a magnetic field closing of the individual magnetized sections, i.e. between the individual permanent magnets, is generated. Furthermore, the row of magnets can thus be integrated in a particular simple way in the inventive magnetic drive system, i.e. serve as a row of hard-magnetic elements, with which, when appropriately activated, the individual coils cause an interaction generating the advance forces. This feature further achieves that the guiding element, which guarantees the gap-shaped distance, in case of tolerances of the carrying element acting on both sides, does not have to absorb important forces, because at best the forces acting between the at least one row of magnets and the carrying element in the direction of magnetization neutralize each other. This effect is greatly enhanced by an increasing number of alternating polarizations, as thus both, tolerances in the field strengths of individual polarization sections are better compensated for, and a superimposition of the forces respectively generated by the individual polarization sections occurs, such as to generate a field, which counteracts the creation of transverse forces. At least three consecutive polarization sections should be provided, in order to avoid side tilting of the row of magnets, which is likely to happen with only two polarization sections of the row of magnets, and which can already generate important transverse forces.

In the inventive magnetic carrying and drive system, preferably the carrying element is, or parts thereof are formed by the row of soft-magnetic elements interrupted at certain intervals. Hereby, an integration of the magnetic carrying system with the inventive magnetic drive system is accomplished, as a result thereof the required construction space being reduced.

In the inventively combined magnetic carrying and drive system, the carrying element preferably has at least one carrying rail, which is disposed at a first certain distance to a side of one of the at least one row of magnets, the coil arrangement being disposed at a second certain distance to a second side of the row of magnets opposite the first side of the row of magnets. Such a separate assignment of the two main functions, namely "generate advance" and "support magnetically" to the opposite pole faces of the magnets of the row of magnets achieves an extensive separation of functions despite an integration of these functions into the one row of magnets, which separated functions allow for optimizing the system parameters of these main functions. Furthermore, transverse forces are compensated in that the carrying profiles and/or the coil cores or the pole shoes of the individual coils of the coil arrangement or the air gaps are designed such that the resultant magnetic transverse forces acting upon the magnets of the row of magnets, are as small as possible or neutralize each other. By disposing the driving coils of the coil arrangement on the one side of the at least one row of permanent magnets and of the preferably soft-magnetic carrying element on the other side of the at least one row of permanent magnets, the carrying profile can additionally assume the tasks of the magnetic closing of the magnetic fields of the coils, as well as of generating carrying forces, which partially or totally absorb the weight of the load capacity, e.g. of a door leaf. If the carrying element partially absorbs the weight of the load capacity, the residual load can be carried e.g. by the coil cores or pole shoes of the individual coils of the coil arrangement of the linear drive unit or by another magnetic force of the mechanical carrying device.

For this purpose, the carrying element may have preferably two carrying rails, the one of them being disposed at a certain distance to a first side of the at least one row of magnets and the other one being disposed at the same certain distance to a second side of the row of magnets opposite the first side of the row of magnets, or of another row of magnets of the at least one row of magnets.

lternatively, for this purpose the carrying element may have a U-shaped carrying rail with a bottom section and two lateral sections, the bottom section connecting the two lateral sections, and at least one row of magnets of the at least one row of magnets being at least partially guided in the U-shaped carrying rail such that at least parts of an inner surface of the one lateral section are disposed at the certain distance to a first side of the row of magnets and at least parts of an inner surface of the other lateral section are disposed at the same or at another certain gap-shaped distance to a second side of the row of magnets opposite the first side of the row of magnets, or of another row of magnets of the at least one row of magnets.

Preferably, the distance between the row of magnets and the carrying element is kept as small as possible.

According to the invention, the at least one carrying element used in the inventively used magnetic carrying device is preferably stationary and the at least one row of magnets is non-stationary, i.e. in case of a sliding door, it is suspended at the at least one row of magnets, whereas the at least one carrying element forms a guide for the door panel or for the door panels of a multi-leaf sliding door. Of course it is possible to develop the at least one carrying element as non-stationary and the at least one row of magnets as stationary, as well as to have a combination of these two variants. Obviously, the coil arrangement of the linear drive unit together with the carrying element of the carrying device is always stationary or non-stationary. In case of a small displacement path, as normally found in the drive of door leaves, no excessively high costs are incurred, but the rotor and thus the whole moving element of the inventive drive system or of the combined magnetic carrying and drive system can be passively designed.

According to the invention, the at least one carrying element is preferably soft-magnetic, resulting in particularly low costs for this element.

According to the invention, the guiding element preferably comprises rollers, rolling and/or sliding members.

According to the invention, the at least one row of magnets preferably consists of one or more high energy magnets, preferably of rare earth high energy magnets, further preferably of neodymium-iron-boron (NeFeB), or of samarium cobalt ($Sm_2Co$) or of plastic-bound magnetic materials. By using such high energy magnets, it is possible, on account of their higher residual induction, to generate considerably higher force densities than with ferrite magnets. Therefore, with a given portative force, the magnetic system can have small geometric dimensions with high energy magnets and thus be built in a space-saving manner. The higher material cost of the high energy magnets compared to ferrite magnets is at least compensated by the relatively small volume of the magnets.

The inventive drive system or the combined carrying and drive system is used to drive at least one door leaf of a sliding door, which is preferably formed as an arched sliding door or as a horizontal sliding wall. In addition to this application, it may be used as a drive for gate leaves or in feeding devices, handling equipment or transport systems.

All preferred embodiments described above with regard to the first or second alternative development of an inventive sliding door may be arbitrarily combined with each other—as may be the first and second alternative developments.

BRIEF DESCRIPTION OF THE DRAWINGS

The invention will now be described in more detail, based on diagrammatically illustrated exemplary embodiments, in which:

FIGS. 16*a*, 16*b* and 16*c* show further illustrations of preferred embodiments of inventive individual magnets of the row(s) of magnets, FIGS. 17*a*, 17*b* and 17*c* show another illustration of a preferred embodiment of inventive pole shoes and an illustration of a preferred embodiment of inventive coil cores.

DETAILED DESCRIPTION OF THE PRESENTLY PREFERRED EMBODIMENTS

Figure 1C:
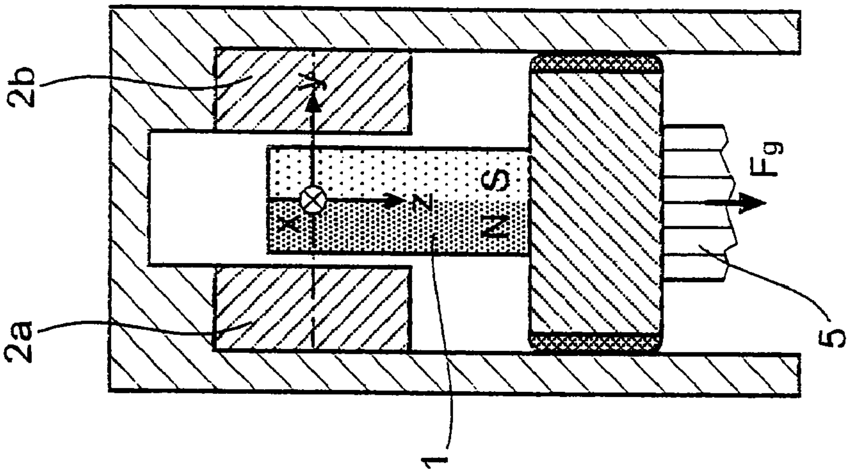
FIGS. 1*a* to 1*e* show a cross-section of a first preferred embodiment of the inventively preferably used magnetic carrying device in different load states.

FIGS. 1*a* to 1*e* show a basic diagrammatical illustration of a first preferred embodiment of the inventively, preferably used magnetic carrying device in cross-section. As an explanation, a coordinate system is drawn in, wherein an x-direction indicates a direction of travelling of a door leaf 5 suspended at the inventive carrying device. The direction of the transverse forces acting upon the magnetic carrying device is the y-direction, and the vertical magnetic deflection downward due to the weight of the suspended door leaves 5 is drawn in the z-direction.

A row of magnets 1 (including magnets 1*a*, 1*b*, 1*c*, and 1*d* (see FIG. 4)), attached at a carrying slide 4, is forcibly guided centred in horizontal direction between soft-magnetic carrying rails 2*a*, 2*b*, forming the carrying element 2, by means of a mechanical guiding element 3 provided at the carrying slide 4 and cooperating with a housing 6 of the carrying device, whereas the row is freely displaceable in vertical direction and in the direction of travelling (x) of the door leaf 5. On account of the thus forced symmetry, the transverse forces acting upon the magnets 1*a*, 1*b*, 1*c*, 1*d* in y-direction largely neutralize each other. In vertical direction (z-direction) it is only in a load-free state, namely without a load attached to the carrying slide 4, as shown in FIG. 1*a*, that the magnets 1*a*, 1*b*, 1*c*, 1*d* have a symmetrical position.

Figure 1B:
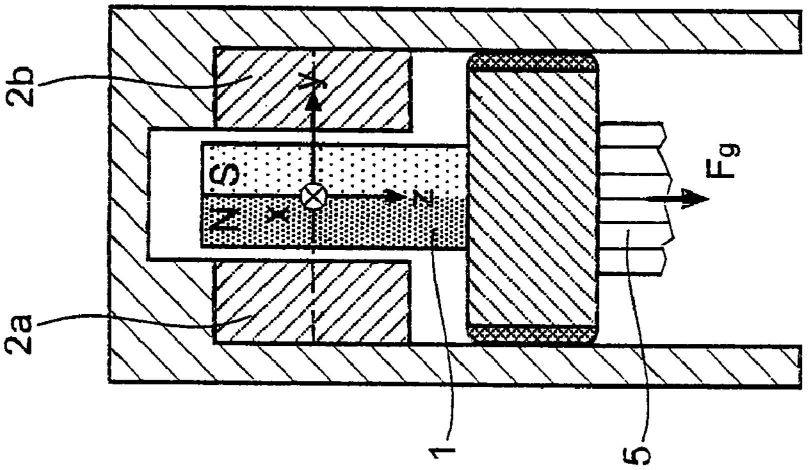
Figure 1A:
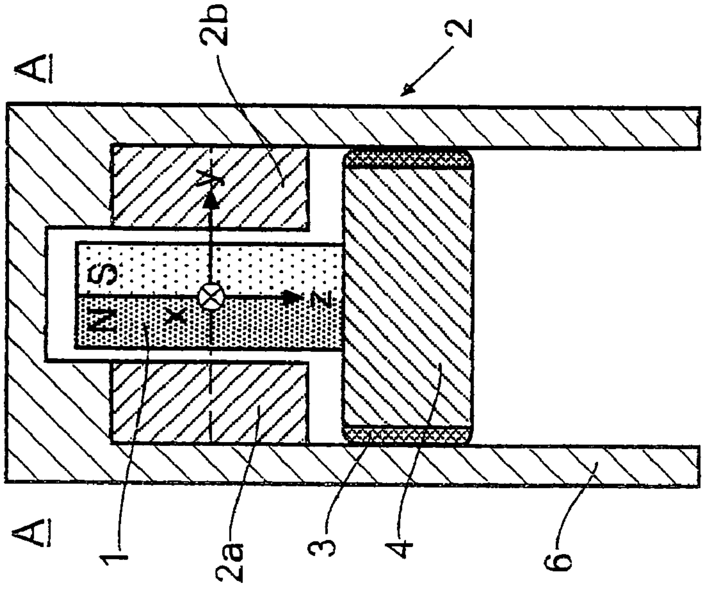
Figure 1E:
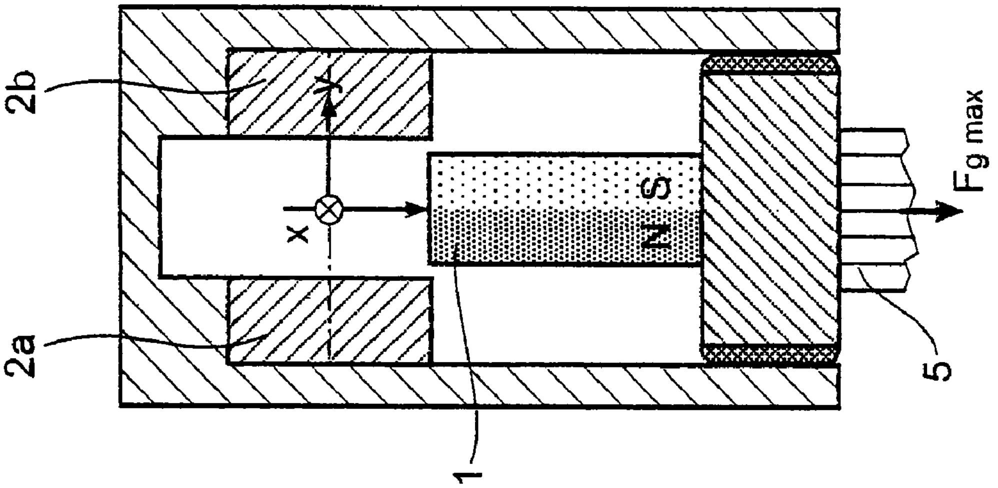

When the magnets 1*a*, 1*b*, 1*c*, 1*d* are loaded with a weight $F_g$, e.g. by the door leaf 5 attached to the carrying slide 4, they are moved in vertical direction from the symmetrical position shown in FIG. 1*a* via an intermediate state shown in FIG. 1*b* into a state of equilibrium shown in FIG. 1*c*, which is determined by the weight $F_g$ to be carried and a magnetic restoring force between the magnets 1*a*, 1*b*, 1*c*, 1*d* of the row of magnets 1 and the carrying rails 2*a*, 2*b* of the carrying element 2, in the following likewise indicated as portative force F(z). The cause of this restoring force are the attractive forces acting between the magnets 1*a*, 1*b*, 1*c*, 1*d* of the row of magnets 1 and the carrying rails 2*a*, 2*b*, wherein only the portion of the magnets 1*a*, 1*b*, 1*c*, 1*d* protruding downward from between the carrying rails 2*a*, 2*b* contributes to this magnetic portative force. As this portion increases with an increasing vertical deflection, the amount of the magnetic portative force rises continuously with the deflection.

Figure 1D:
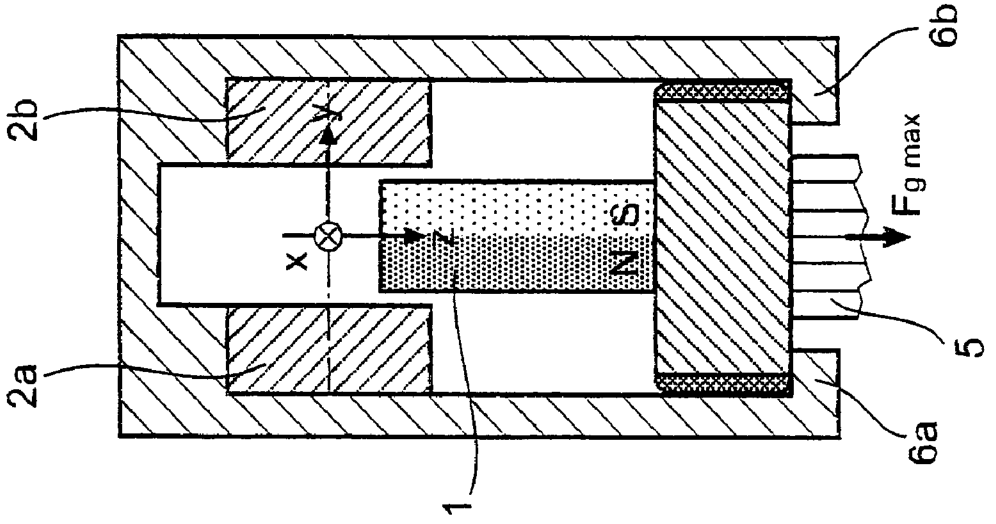
Figure 2:
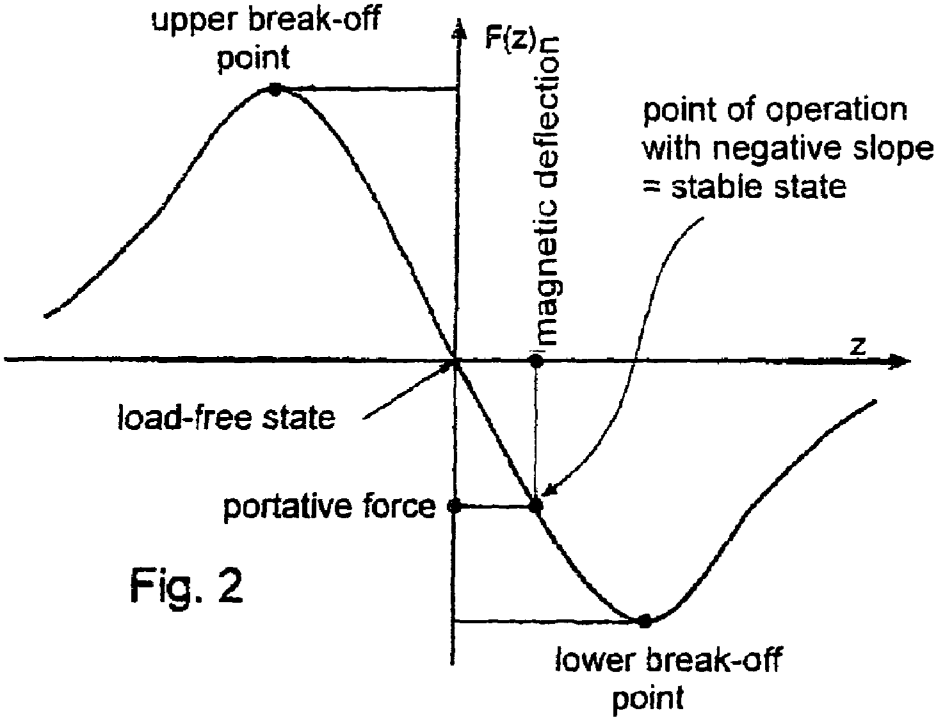
FIG. 2 shows the portative force characteristic curve of the magnetic carrying device according to the first preferred embodiment shown in FIGS. 1*a* to 1*e*.

FIG. 2 shows the dependence between the vertical deflection of the row of magnets 1 and the magnetic portative force in a characteristic curve, i.e. the portative force characteristic curve according to the embodiment shown in FIGS. 1*a* to 1*e*. The downward vertical deflection z, e.g. in mm, is shown on the abscissa, and the corresponding generated magnetic portative force F(z), e.g. in newton, is indicated on the ordinate. The course of the portative force characteristic curve is marked by an upper and by a lower break-off points, which are reached respectively, if the magnets completely protrude upward or downward from between the carrying rails, as indicated for the downward case in FIG. 1*e*. If this critical deflection is exceeded due to forces, the restoring forces are weakened on account of the increasing distance to the carrying rails 2*a*, 2*b* , such that no stable state of equilibrium can be reached in these areas between the portative force F(z) and the weight $F_g$ due to the load.

Practically such breaking-off of the portative force F(z), caused by the weight $F_g$ of the door leaf mass, can be reliably avoided through a mechanical limitation of the potential deflection of the row of magnets 1, as shown by way of example in FIG.1*d*. In this case, the housing 6, accommodating the carrying rails 2*a*, 2*b* and offering a horizontal guidance for the guiding element 3, comprises two projections 6*a*, 6*b*, which are simultaneously disposed at its lower ends and are a mechanical limitation to the potential deflection of the carrying slide 4 and thus of the thereto rigidly attached row of magnets 1 in z-direction.

The portative force characteristic curve is almost linear between the upper break-off point and the lower break-off point, wherein, with a positive deflection of the row of magnets 1, i.e. a downward deflection, which is caused by the door leaf 5 attached to the carrying slide 4, from the point of origin in the coordinate system between the vertical deflection z of the row of magnets 1 and the magnetic portative force F(z) to the lower break-off point on the portative force characteristic curve, operating points pass through a negative slope, wherein the row of magnets 1 can settle in a respective stable state between the carrying rails 2*a*, 2*b*, on account of the weight $F_g$ acting upon the row of magnets 1 and the equivalent magnetic portative force F(z) acting in the opposite direction.

With a strict symmetry about the vertical central axis (z-axis) of the described magnetic carrying device, which depends on both the disposition of the carrying device and on the mechanical guiding element 3, the horizontal magnetic force components completely neutralize each other in transverse direction, i.e. in y-direction. If the row of magnets 1 leaves this exact central position because of tolerances, a transverse force F(y) acting upon the row of magnets 1 is produced due to attractive forces varying in strength towards the two carrying rails 2*a*, 2*b*.

Figure 3:
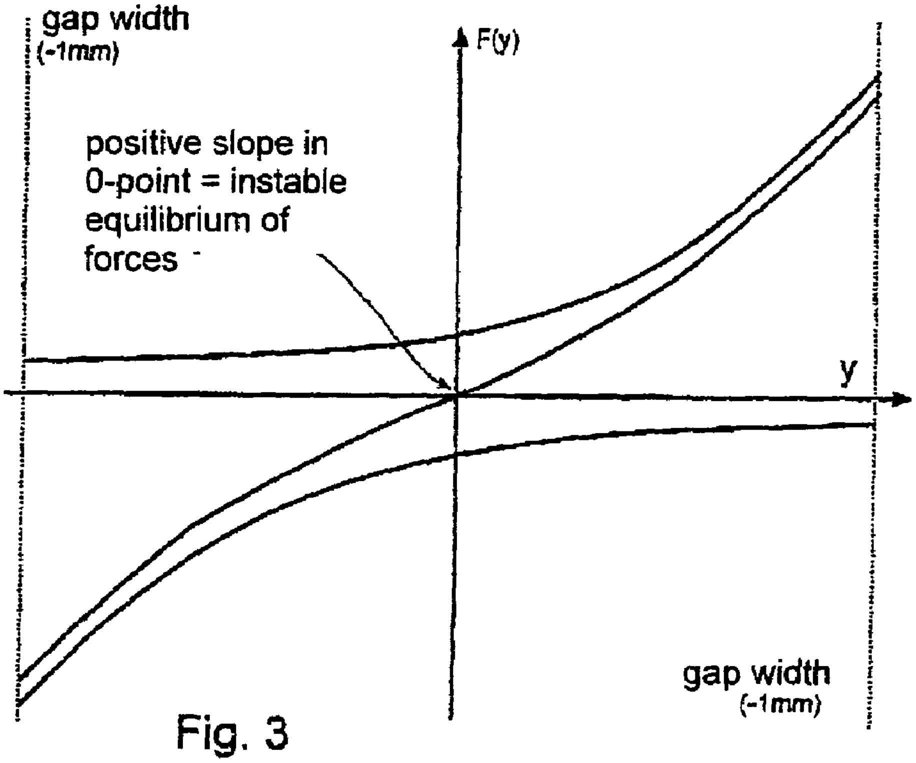
FIG. 3 shows the curve of the transverse force of the magnetic carrying device according to the first preferred embodiment shown in FIGS. 1*a* to 1*e*.

For a gap width of e.g. −1 mm to +1 mm, FIG. 3 shows a curve of the transverse force F(y) as a function of a lateral displacement y of the magnets 1*a*, 1*b*, 1*c*, 1*d*, which curve has a positive slope along the entire course. This means that at the origin of the coordinate system, which corresponds to the central position of the row of magnets 1 between the carrying rails 2*a*, 2*b*, there is an unstable equilibrium of forces. A resultant transverse force F(y) prevails at all other points in the coordinate system.

As there is only an unstable equilibrium of forces in the central position, the guiding element 3 has to offer a precise mechanical support, which guides the row of magnets 1 exactly centred between the carrying rails 2*a*, 2*b* during a travelling movement of the row of magnets 1 in the direction of motion, i.e. in the x-direction. The more precise this centering can be realized, the lower are the resultant transverse force F(y) and thus frictional forces of the mechanical support linked thereto.

In order to optimize the carrying properties, the magnet width, i.e. the dimensions of the row of magnets 1 or of the individual magnets 1*a*, 1*b*, 1*c*, 1*d* thereof in y-direction should be as large as possible, because a large magnet width causes an important field strength resulting in important portative forces. The magnet height, meaning the dimensions of the row of magnets or of the individual magnets 1*a*, 1*b*, 1*c*, 1*d* thereof in z-direction, should be as small as possible, because low magnet heights increase the rigidity of the field of portative forces by concentrating the field.

The height of the carrying rails 2*a*, 2*b* should be as small as possible, a carrying rail height of less than ½ of the magnet height is advantageous, because the field lines of the permanent magnets are concentrated and this increases the rigidity of the magnetic carrying system.

The disposition is to be selected such that, in the state of equilibrium in which the magnetic portative force F(z) is equivalent to the weight $F_g$ caused by the door leaf 5 loading the row of magnets 1, the soft-magnetic carrying rails 2*a*, 2*b* are disposed vertically unsymmetrical about the row of magnets 1, and the row of magnets 1 should be as continuous as possible in order to avoid cogging forces in the direction of motion, i.e. in x-direction.

Figure 4:
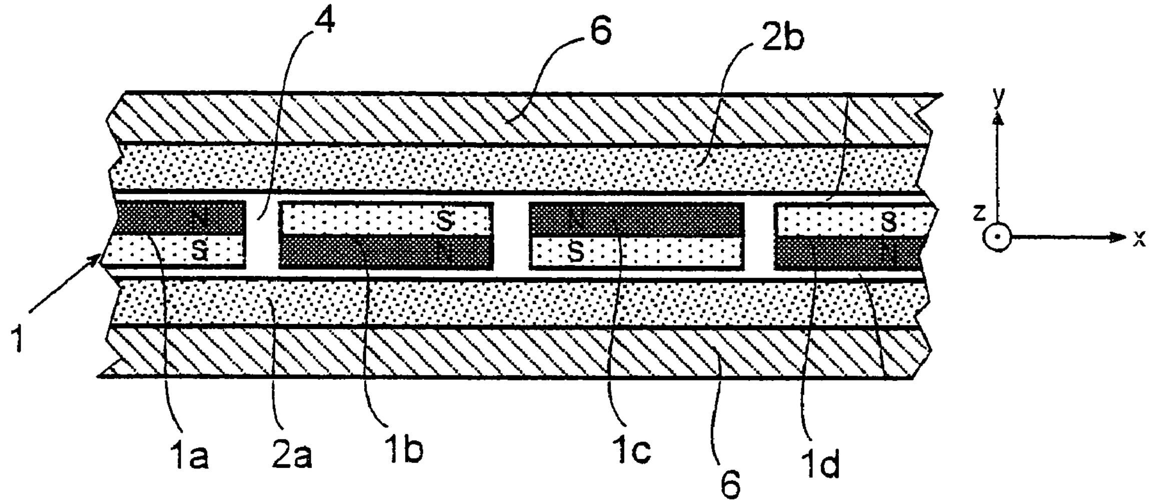
FIG. 4 shows a sectional illustration in a top view of the magnetic carrying device according to the first preferred embodiment shown in FIGS. 1*a* to 1*e*, FIGS. 5*a* and 5*b* show a perspective view of a first preferred embodiment of a part of the inventively combined carrying and drive system with three coils oriented perpendicularly to the driving direction and a U-shaped sheet metal mount, as well as three contacting and fastening pins without and with the U-shaped carrying rail element.

In FIG. 4 a sectional illustration along a line A-A is shown of a top view of the carrying device shown in FIG. 1*a* according to the first preferred embodiment. It can be seen that the row of magnets 1 consists of individual magnets 1*a*, 1*b*, 1*c*, 1*d*, which, with an alternating direction of magnetization, are disposed between the two carrying rails 2*a*, 2*b*, which are laterally disposed and consist of a soft-magnetic material. In this embodiment, in which the carrying rails 2*a*, 2*b* constitute the stationary part of the inventive carrying device, the individual magnets 1*a*, 1*b*, 1*c*, 1*d*, for forming the row of magnets 1, are attached at the movable carrying slide 4 and can be displaced between the rails 2*a*, 2*b* in the x and z-directions. With a vertical displacement, i.e. a displacement in the z-direction, covering a small distance of about 3-5 mm from the zero position, i.e. the geometrical symmetry position, a considerable restoring force is produced by using very strong permanent magnets, e.g. made from Nd-Fe-B, which force is suitable to carry a sliding door leaf 5 having a weight of about 80 kg/in. In the disposition shown in FIG. 4, wherein the permanent magnets 1*a*, 1*b*, 1*c*, 1*d* are disposed with an alternating direction of magnetization between the two carrying rails 2*a*, 2*b*, the field closing through the carrying rails 2*a*, 2*b* is positively enhanced in case of a two-way alternating direction of magnetization of the magnets disposed adjacent each other.

Figure 5A:
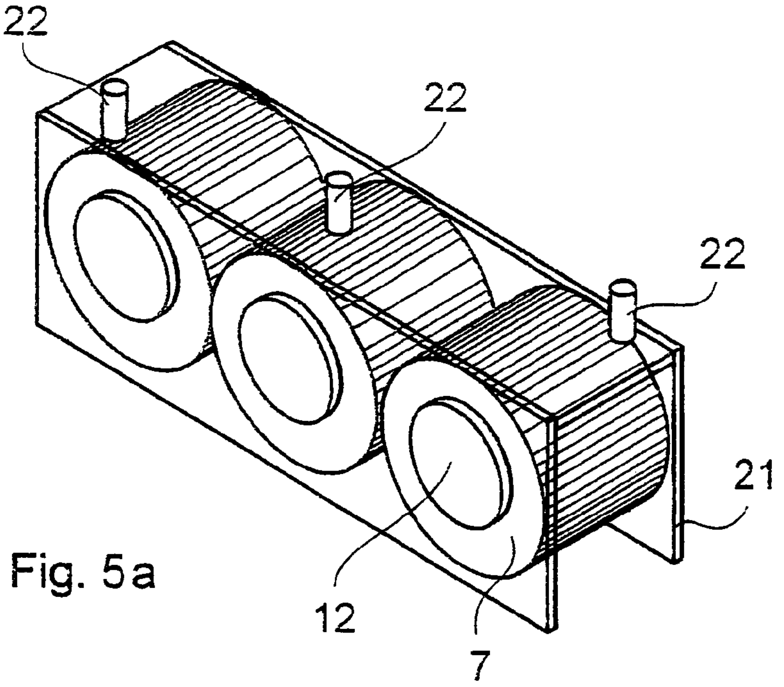
Figure 5B:
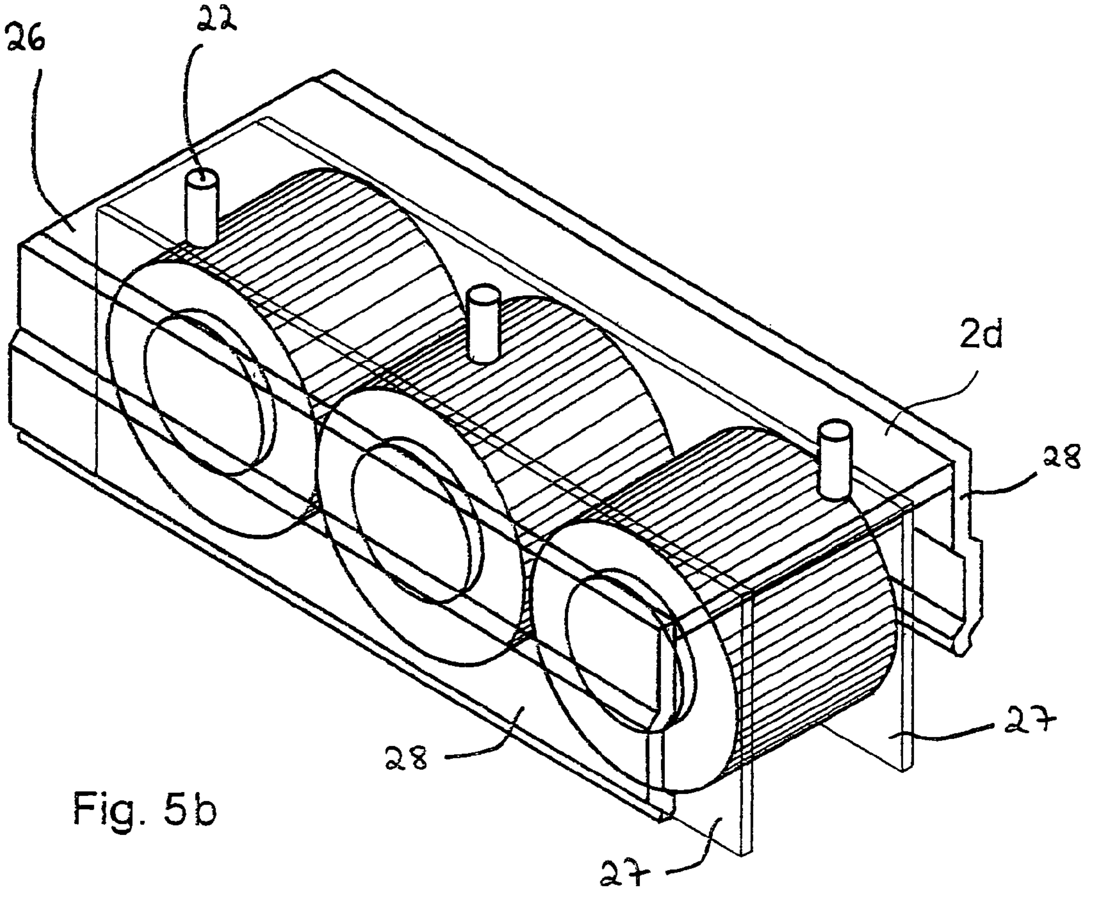

FIGS. 5*a* and 5*b* show a drive segment of a first preferred embodiment of the inventive drive segment in a perspective illustration. Herein an inventive coil module, to be used as a stator module or a as rotor module, consists of three coils 7 with coil cores 12 oriented perpendicular to the direction of travelling, which are disposed in a U-shaped sheet metal mount 21 from which three contacting and fastening pins 22 protrude electrically insulatedly. Via these contacting and fastening pins 22, the coil module can be fastened, as well as activated through energizing the individual coils. The U-shaped sheet metal mount, to which the coils 7 are attached, e.g. by means of resistance spot welding, riveting or caulking, may serve as common ground. This inventive coil module shown in FIG. 5*a* is inserted in a basically U-shaped carrying rail 2*d* in FIG. 5*b*, the contacting and fastening pins 22 protruding through the bottom section 26 thereof An air gap exists between each of the lateral walls 27 of the U-shaped sheet metal mount 21 and the lateral walls 28 of the U-shaped carrying rail 2*d*. One row of magnets in each air gap is in interaction with the carrying rail 2*d* and the coils 7 in order to be moved in the direction of travel.

Figure 6:
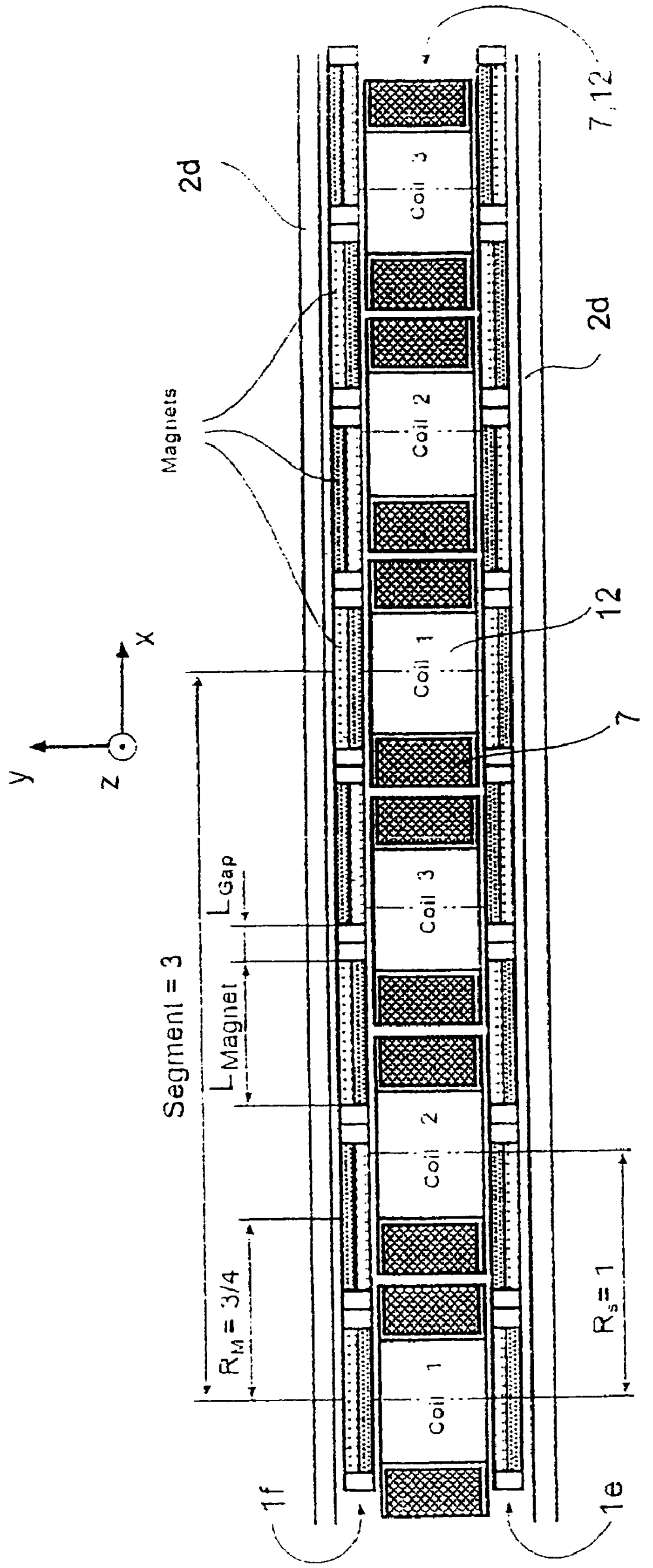
FIG. 6 shows a sectional illustration in a top view of the first preferred embodiment of the inventively combined carrying and drive system.

FIG. 6 shows two drive segments of the first preferred embodiment of the inventive drive system, in this case as a combined magnetic carrying and drive system in a sectional top view, wherein the inventively used magnetic linear drive acts upon the rows of magnets 1*e*, 1*f*, which are attached to a carrying slide 4, not illustrated. The two rows of magnets 1*e*, 1*f* have respectively alternatingly polarized individual magnets, the polarities of the individual magnets, disposed offset in transverse direction, of the two rows of magnets 1*e*, 1*f*, being oriented in the same direction. The coils 7 are disposed between the rows of magnets 1*e*, 1*f* such that the respective coil core 12 extends in transverse direction, i.e. y-direction. Respectively one lateral section of the carrying rail 2*d* is located on the side of the row of magnets 1*e*, 1*f* oriented away from the coils 7 with coil cores 12.

In order to guarantee a continuous advance of the row of magnets 1*e*, 1*f*, the stator coils 7 with their respective coil cores 12 are disposed at different relative positions with regard to the raster of the permanent magnets. The more different relative positions are formed, the more uniformly the thrust force can be realized along the travel path. As, on the other hand, each relative position has to be assigned to an electric phase of an activation system needed for the linear drive, the least possible amount of electrical phases should be employed. On account of the provided three-phase rotary current network, a three-phase system, as shown by way of example in FIG. 7, can be built very inexpensively.

In this case, a respective drive segment and thus a coil module of the linear drive unit consists of three coils 7*a*, 7*b*, 7*c*, which have a dimension of three length units in the driving direction, i.e. x-direction, wherein thus one raster $R_s$=1 length unit is located between the centres of adjacent coil cores 12. In this case, the length of a magnet of the row of magnets 1*e*, 1*f* in driving direction and the length of the gap located between the individual magnets of the row of magnets 1*e*, 1*f* is selected such that the length of a magnet $L_{Magnet}$+length of a gap $L_{Gap}$=magnet raster $R_M$=¾ length unit (=¾ $R_s$).

Figure 7:
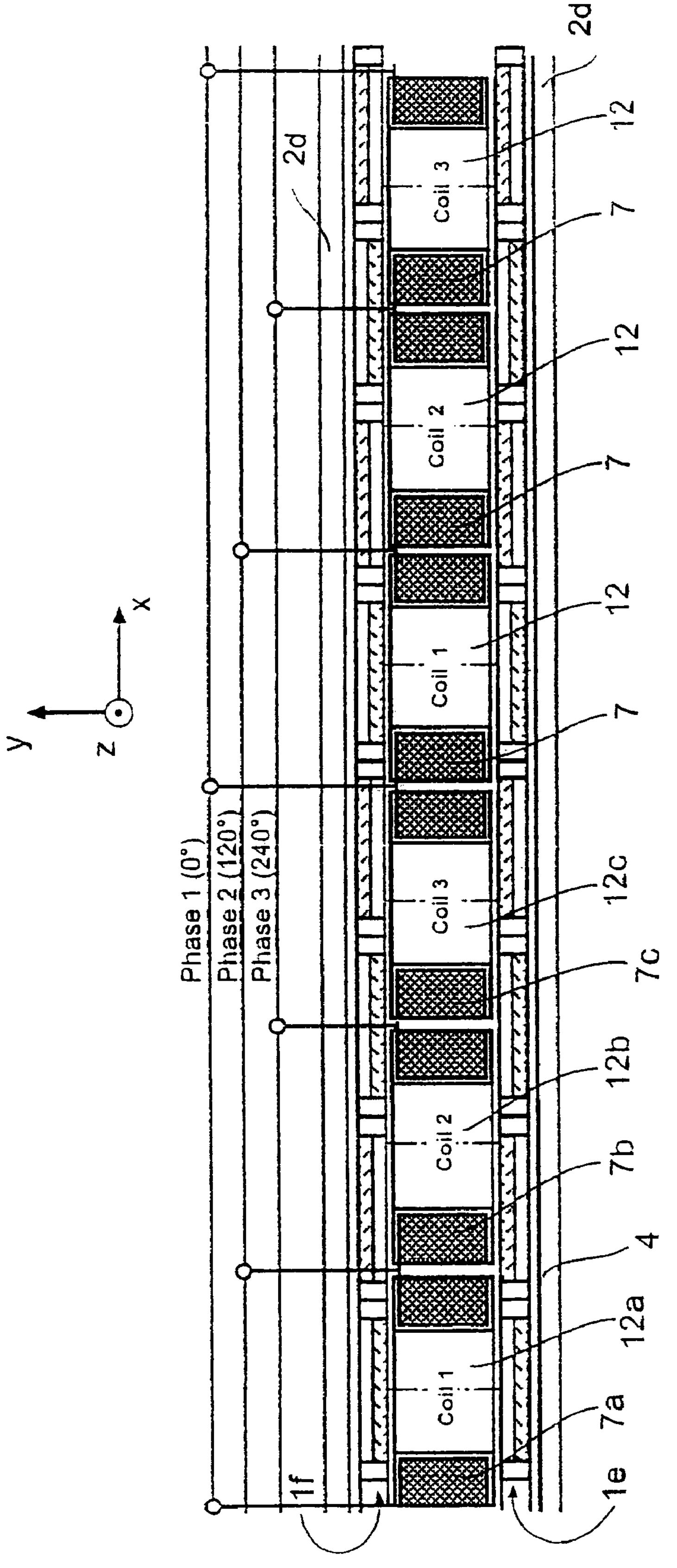
FIG. 7 shows an electrical interconnection of the coils of the linear drive unit of the combined carrying and drive system shown in FIG. 6.

FIG. 7 shows the interconnection of the coils of the two drive segments of the inventively used linear drive unit shown in FIG. 6. In this case, a first coil 7*a* with a first coil core 12*a* is connected between a first phase and a second phase of a rotary current system consisting of three phases, which three phases are uniformly distributed, namely the second phase at 120° and a third phase at 240°, if the first phase is at 0°. In positive driving direction, i.e. +x-direction, the second coil 7*b* with coil core 12*b* of a drive segment of the linear drive unit, located next to the first coil 7*a* with coil core 12*a*, is connected between the second phase and the third phase, and in positive driving direction, i.e. +x-direction, the third coil 7*c* with coil core 12*c*, located next to the second coil 7*b* with coil core 12*b*, is connected between the third phase and the first phase. The drive segments of the linear drive unit, adjacent such a drive segment of the linear drive unit, are connected in the same way to the three phases of the rotary current system.

If, analogously to the disposition in a two pole direct current motor, phase angles are assigned to the pole raster formed by the permanent magnets, the linear coil arrangements could be depicted in a circular phase diagram. As this diagram can be interpreted magnetically for the driving effect on the permanent magnets, as well as electrically for the activation of the coils, it allows to consistently describe the correlation between switching states and driving effect.

Figure 8:
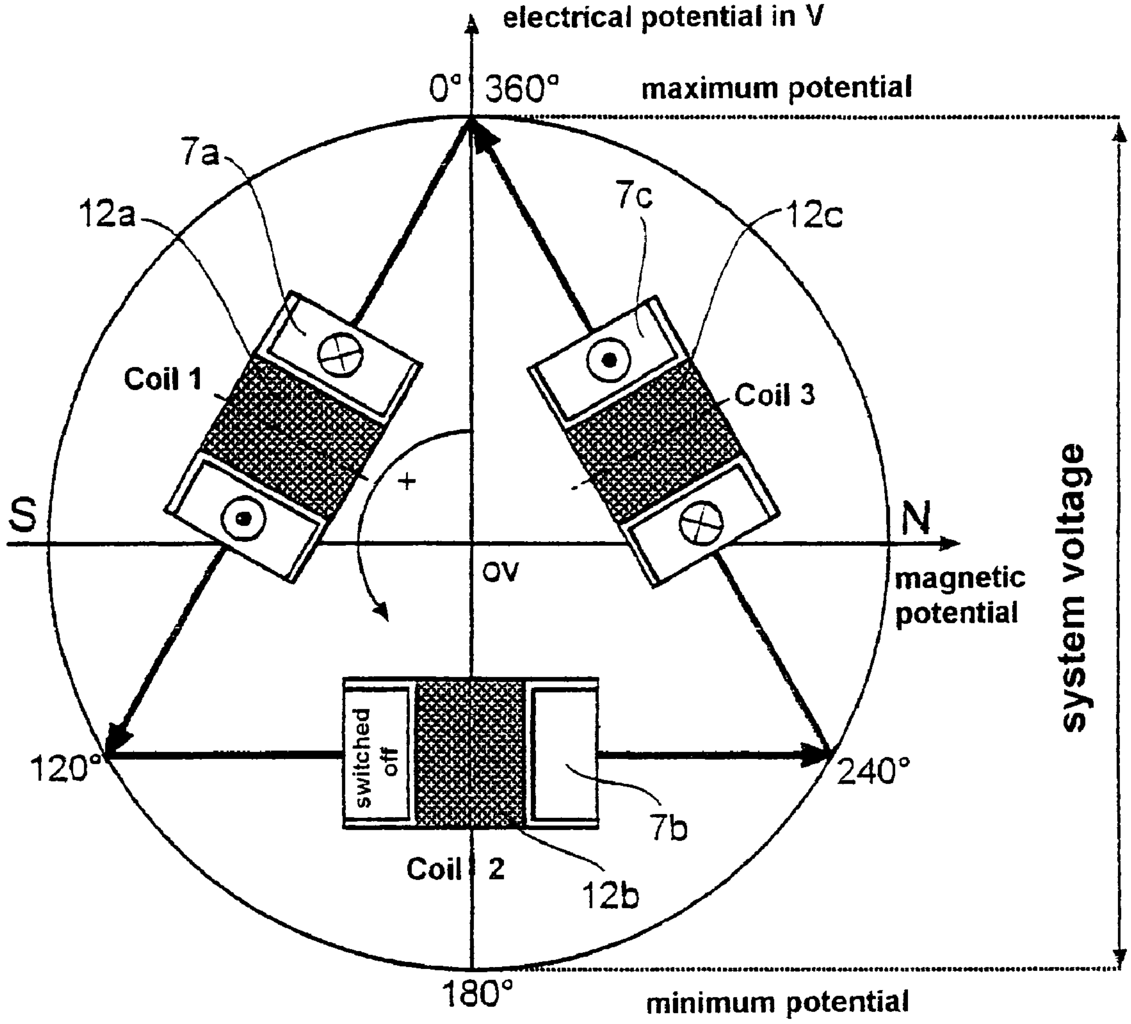
FIG. 8 shows a diagram explaining a first possibility of the voltage curve of the coils, interconnected as shown in FIG. 7, of the first preferred embodiment of the inventive drive system.

Such a circular phase diagram with coils drawn-in is shown in FIG. 8. In this case, the electrical potential in V is indicated on the ordinate and the magnetic potential on the abscissa. A circle around the origin of this coordinate system, which represents a zero potential for both the electrical potential and the magnetic potential, represents the phase positions of the voltage applied to the respective coils, a 0° phase position being given at the intersection of the circle with the positive ordinate, and the phase changing counter-clockwise to a 90° phase position, at the intersection of the circle with the negative abscissa, which represents the magnetic potential of the south pole, to a 180° phase position at the intersection of the circle with the negative ordinate, which represents the minimum electric potential, to a 270° phase position at the intersection of the circle with the positive abscissa, which represents the magnetic potential of the north pole, and up to a 360° phase position, equivalent to the 0° phase position, at the intersection of the circle with the positive ordinate, which represents the maximum electric potential.

As FIG. 7 shows, a correlation is given, in which the first coil 7*a* with magnetic core 12*a* is located between a 0° phase position and a 120° phase position, the second coil 7*b* with magnetic core 12*b* between a 120° phase position and a 240° phase position, and the third coil 7*c* with magnetic core 7*c* between a 240° phase position and a 360° phase position. With a rotary current operation, the phasors of these coils will then turn counter-clockwise according to the changing frequency of the rotary current, wherein a respective voltage, corresponding to the electrical potential difference between the start and end points of the phasor projected on the ordinate, being applied to the coils.

In the magnetic interpretation of the phase diagram, a 180° phase pass corresponds to a displacement of the rotor over the distance between the centres of two adjacent magnets, namely the magnet raster $R_M$. During a displacement of about the magnet raster $R_M$, a change of polarity is effected on account of the alternating polarization of the magnets in the rotor. After a 360° phase pass, the rotor displacement amounts to two $R_M$. In this case, the magnets are again in the initial position in relation to the raster $R_S$ of the stator coils, comparable to a 360° rotation of the rotor of a two-pole direct current motor.

For the electrical interpretation of the phase diagram, the ordinate is considered, on which the applied electric potential is illustrated. The maximum potential is applied at 0°, the minimum potential at 180°, and a medium electric potential at 90° or 270°. As already mentioned above, in the diagram, the coils are illustrated by arrows, their start and end points illustrating the contactings. The respectively applied coil voltage can be read on the potential axis through projection of the start and end points of the arrows. The direction of current flow and thus the direction of magnetization of the coil is determined by the direction of the arrows.

Figure 9:
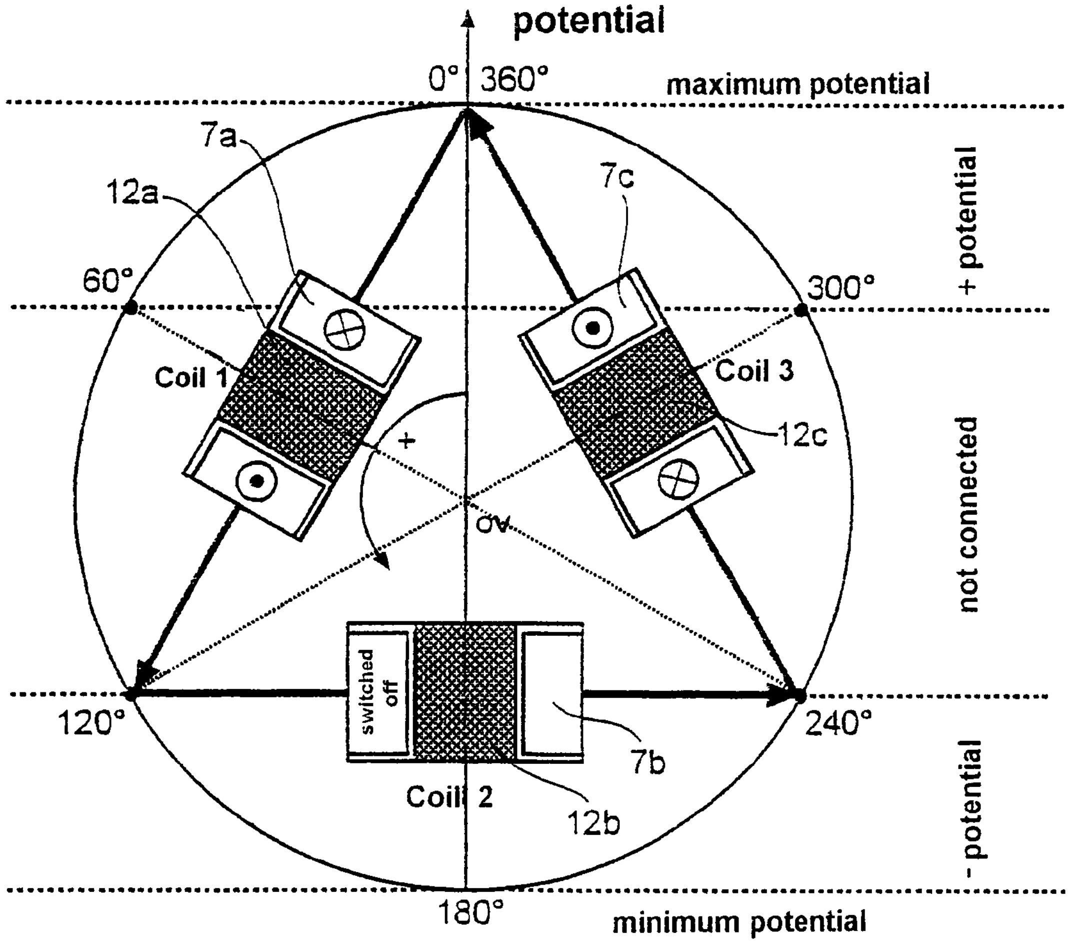
FIG. 9 shows a diagram explaining a second possibility of the voltage curve of the coils, interconnected as shown in FIG. 7, of the first preferred embodiment of the inventive drive system.

Instead of a continuous sinusoidal voltage source, which has a phase diagram according to FIG. 8, a control having a rectangular characteristic can be employed for reasons of costs. In a corresponding phase diagram, which is shown in FIG. 9, the rectangular characteristic is illustrated through switching thresholds. In this case, the phase connections can hold the three states: positive potential, negative potential and potential-free, respectively. In this case, the positive potential is e.g. in a range between 300° and 60° and the negative potential in a range between 120° and 240° and the ranges between 60° and 120° as well as 240° and 300° represent the potential-free condition, in which the coils are not connected. With the rectangular voltage activation, the less uniform thrust is a drawback compared to the sinusoidal control.

Figure 10:
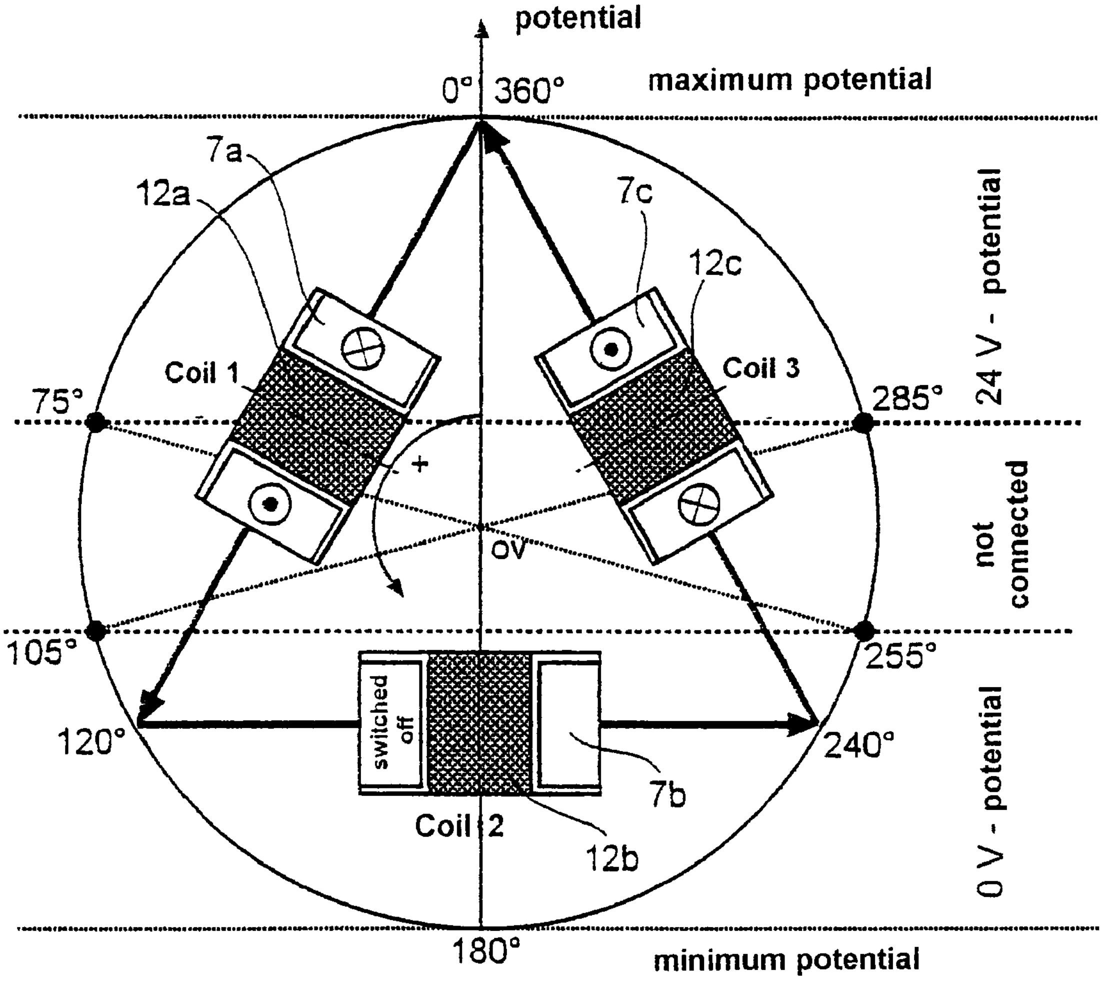
FIG. 10 shows a diagram explaining a third possibility of the voltage curve of the coils, interconnected as shown in FIG. 7, of the first preferred embodiment of the inventive drive system.

It is of course possible to conceive numerous other coil configurations and potential distributions, e.g. the potential distribution shown in FIG. 10, wherein a minimum potential of 0 V is given in a range between 105° and 255°, a maximum potential of 24 V in a range of 285° to 75° and potential-free ranges are given from 75° to 105° and from 255° to 285°.

Figure 11:
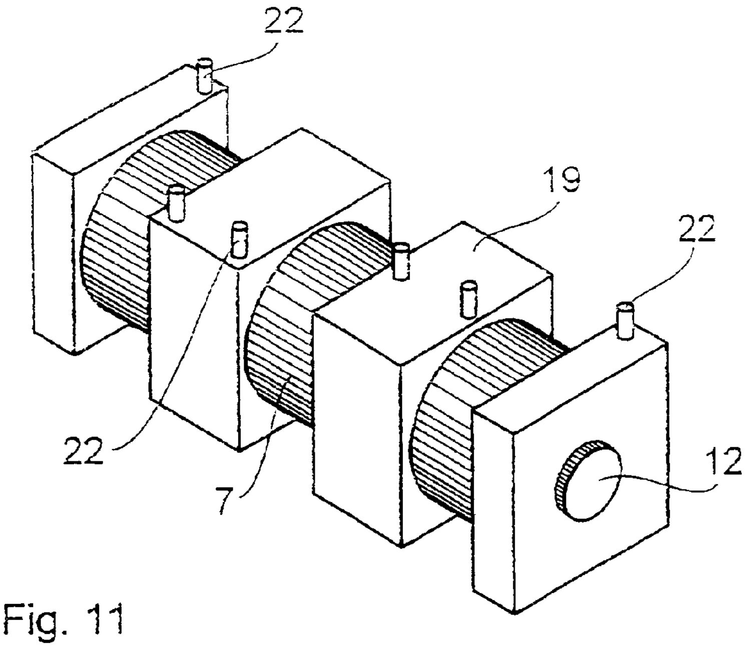
FIG. 11 shows a perspective view of a second preferred embodiment of a part of the inventively combined carrying and drive system with three coils oriented in the direction of travelling, which are wound on a common core, whereby the core and the shown square pole shoes may consist of a compact turned part.

FIG. 11 shows a second preferred embodiment of an inventive coil module, wherein three coils 7, oriented in direction of travelling, are wound on a common coil core 12. The coil core and the square pole shoes 19 disposed between the coils 7 form a compact turned part. For contacting and fastening, two contacting and fastening pins 22 are provided for each coil 7, which protrude insulatedly from the pole shoes 19.

Figure 12A:
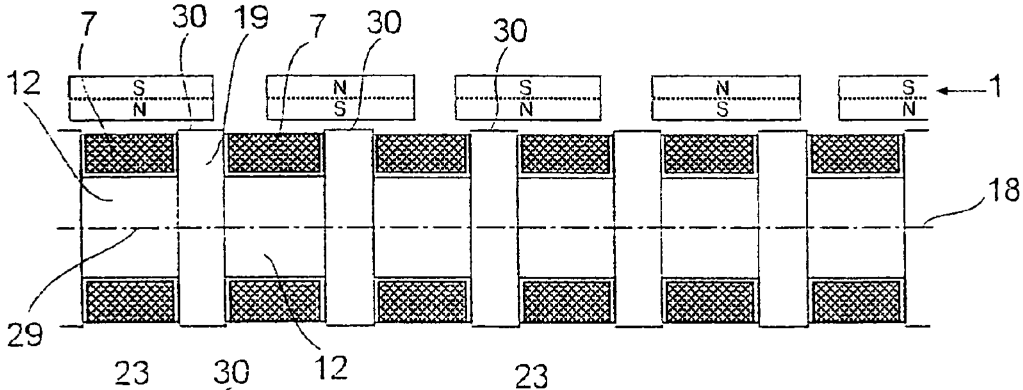
FIGS. 12*a* and 12*b* show coils disposed in series according to the second preferred embodiment, with aligned axes, magnets being disposed opposite on one side thereof, or flux conducting elements being disposed on both sides thereof.

FIG. 12*a* shows two drive segments, i.e. six individual coils 7, disposed in series and having their axes 29 aligned. Between the individual coils 7, pole shoes 19 are disposed, which, opposite one exterior side 30 thereof, are spaced from pole faces of a row of magnets 1 by a gap.

Figure 12B:
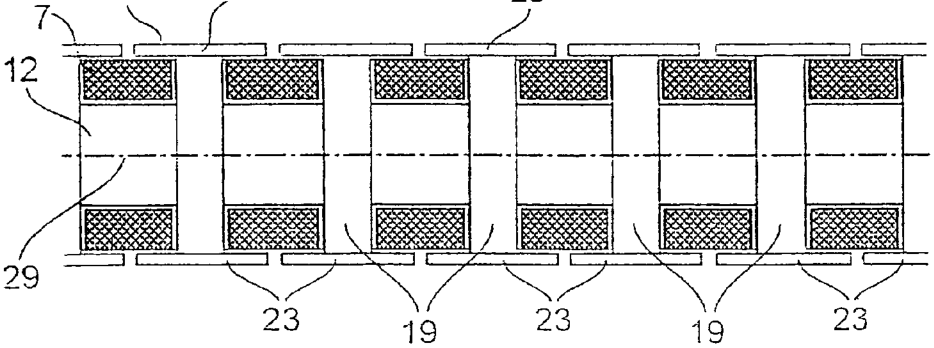

FIG. 12*b* shows a view corresponding to FIG. 12*a*, wherein the row of magnets 1 is not shown, but instead flux conducting elements 23 disposed on sides 30 of the pole shoes 19 almost cover the coils 7 on this side, i.e. enlarge the surface of the pole shoes 19, which is opposite the row of magnets 1.

Figure 13:
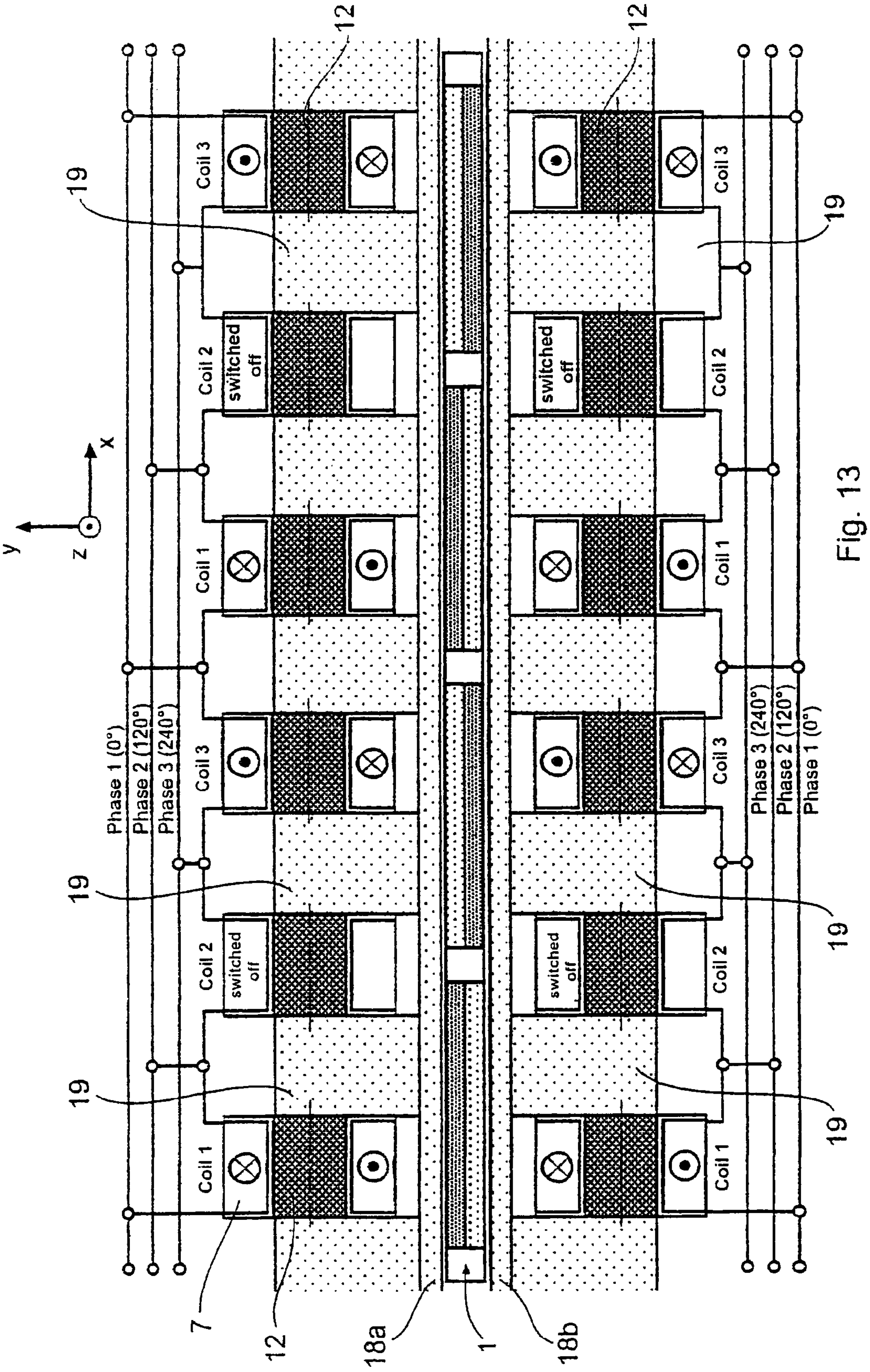
FIG. 13 shows a sectional illustration in a top view of the second preferred embodiment of the inventively combined carrying and drive system.

Furthermore, FIG. 13 shows two drive segments of the second preferred embodiment of the inventive drive system, which in this case, is formed by two coil modules each having six coils, here as a combined magnetic carrying and drive system. The inventively used magnetic linear drive has a three-phase coil arrangement, in which a row of magnets 1 is situated between two pole shoe strips 18*a*, 18*b*. Each strip connects all pole shoes 19, located on one side of the row of magnets 1, of coils of the linear drive unit. In this case, the pole shoes 19 with the respective coil core 12 of the coils 7 extending in driving direction, i.e. x-direction, are formed as a turned part and extend towards the respective pole shoe strip 18$a$, 18$b$, in order to guarantee a better magnetic field closing. The coils of the two shown coil modules, which are disposed on the pole side of the individual magnets of the row of magnets 1, are symmetrically connected as already described. In this embodiment, the magnet raster $R_M$=3/2 of the coil raster $R_s$ is chosen. On account of these features, each coil bridges a phase angle of 120° and after 360° (one rotation=2 $R_M$) all three coils of a drive segment of the linear drive unit are passed through, one drive segment consists of a number of jointly activated coils or pairs of coils corresponding to the electrical phases.

The phase diagram of this arrangement corresponds to the above described arrangement, in which the coils illustrated in the phase diagram by arrows form a triangle, the corners of this triangle illustrating respectively the phases of the activation. In this case, for a rotation about 360°, corresponding to a translation movement of the rotor about three coil rasters, the corners of the triangle pass through three electric potentials: positive, negative, and potential-free, if the rectangular activation shown in FIG. 9 is selected. As each coil bridges a phase angle of 120°, the potential of a phase is changed for a rotation about 60°, and one of the three phases is always potential-free. If the phase potential is represented in a table depending on the number of 60° rotation steps, the following phase activation diagram will be the result:

| | 0° | 60° | 120° | 180° | 240° | 300° |
|---|---|---|---|---|---|---|
| Phase 1 | + | 0 | – | – | 0 | + |
| Phase 2 | 0 | + | + | 0 | – | – |
| Phase 3 | – | – | 0 | + | + | 0 |

By displacing the switching threshold to a negative potential between 105° and 255°, to a positive potential between 285° and 75°, and to potential-free states between 75° and 105°, and 255° and 285°, similar to the state shown in FIG. 10, an activation at 30° increments can be realized. In this case, two phases may have the same potential, such that no voltage difference is applied to the associated coil and no current flows. Respectively one phase is potential-free with each second 30° increment. The respective 30° phase activation diagram with 12 control steps is as follows:

| | 0° | 30° | 60° | 90° | 120° | 150° | 180° | 210° | 240° | 270° | 300° | 330° |
|---|---|---|---|---|---|---|---|---|---|---|---|---|
| Phase 1 | + | + | 0 | – | – | – | – | – | 0 | + | + | + |
| Phase 2 | 0 | + | + | + | + | + | 0 | – | – | – | – | – |
| Phase 3 | – | – | – | – | 0 | + | + | + | + | + | 0 | – |

In order to optimize the advance properties, the magnet width, i.e. the dimensions of the row of magnets 1 or of its individual magnets in y-direction, should be as small as possible, because the permanent magnets have a damping effect, like air, on the magnetic circuit of the coils 7. The magnet height, namely the dimensions of the row(s) of magnets 1, 1$e$, 1$f$, or of their individual magnets in z-direction, should be as high as possible, because a high magnet height results in a large air gap surface, which assists in reducing the magnetic resistance of the coil circuit. At the same time, at lot of magnetic material is brought into the magnetic coil circuit, without creating too large field strengths that would saturate the magnetic circuit. The height of the pole shoes 19 and/or of the coil cores 12 should be as high as possible, so that the pole shoes 19 or the coil cores 12 achieve an as large as possible superimposition with the magnets, such that a large air gap surface with a high potency and small magnetic resistance is the result. The disposition of these soft-magnetic components should achieve an as large as possible vertical superimposition between the coil cores 12 or the pole shoes 19.

Obviously the inventive coil modules can be employed in systems, where the only preferably magnetically supported carrying device is provided separately from the inventive drive system.

Figures 14A, 14B, 14C:
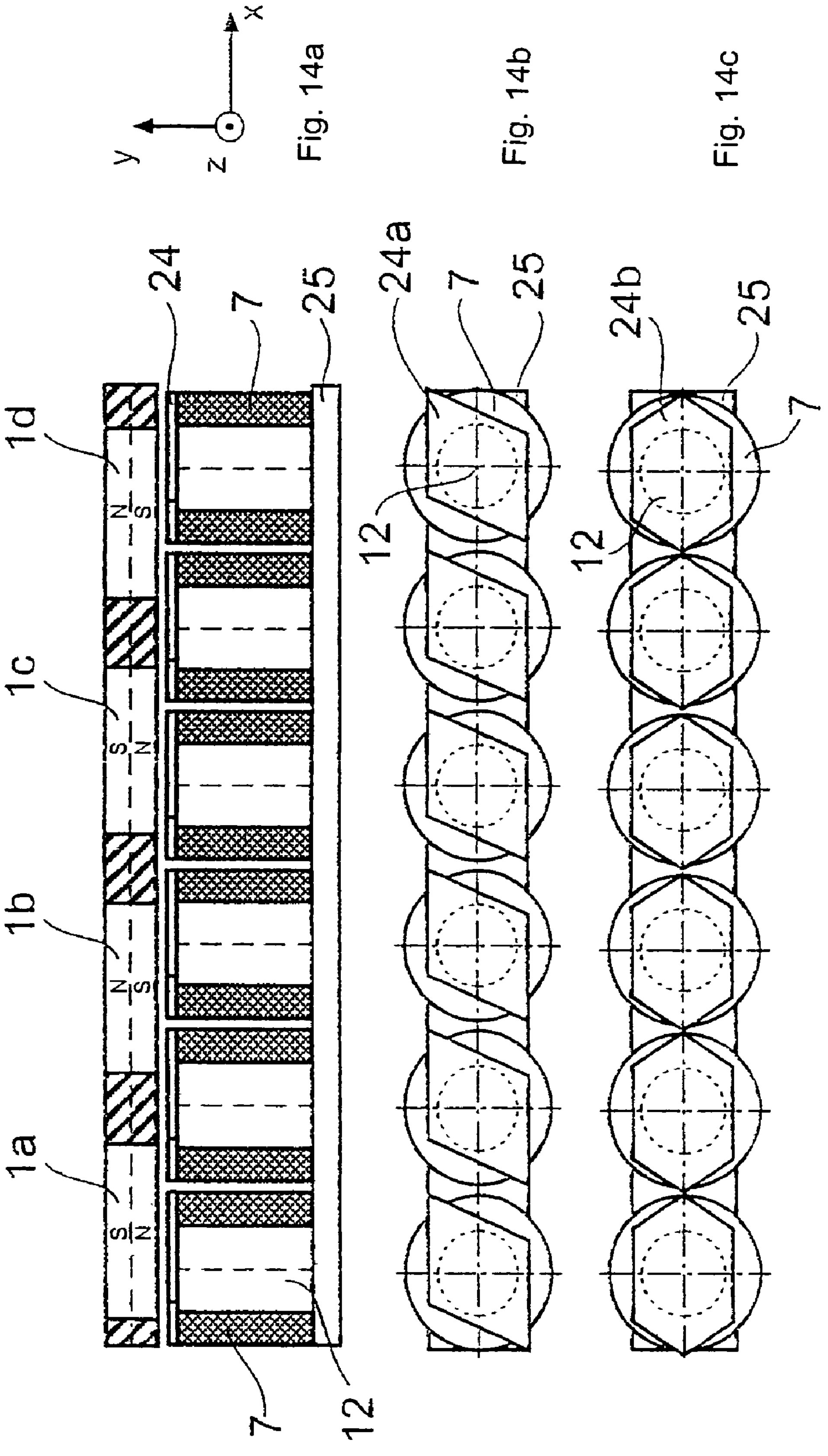
FIGS. 14*a*, 14*b* and 14*c* show illustrations of preferred embodiments of inventive pole shoes.
Figure 15A:
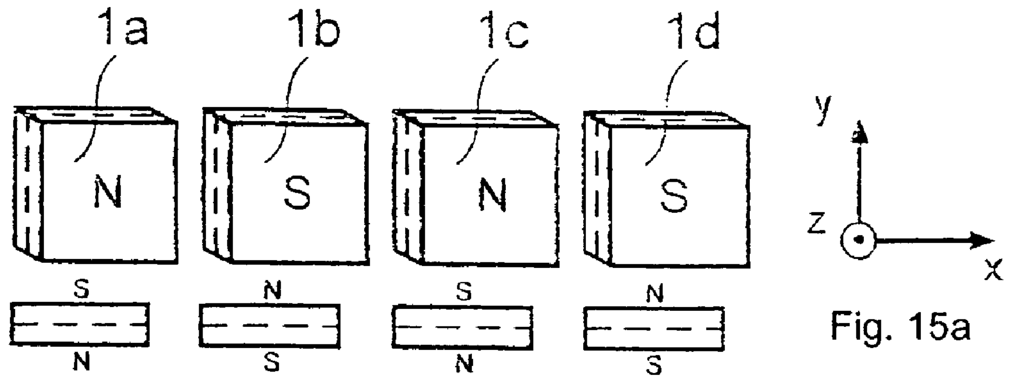
FIGS. 15*a* to 15*e* show illustrations of preferred embodiments of inventive individual magnets of the row(s) of magnets.
Figure 15B:
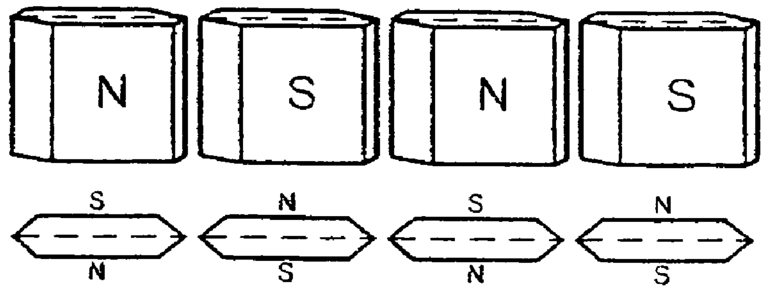
Figure 15C:
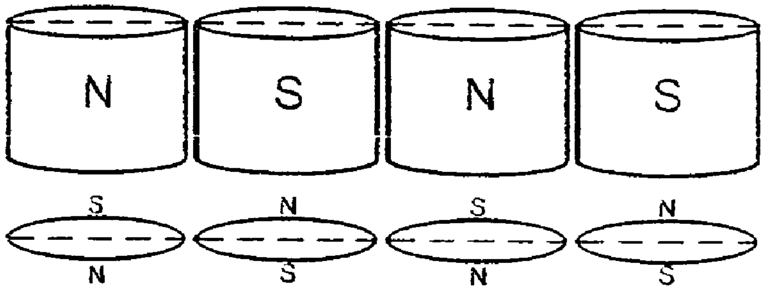
Figure 15D:
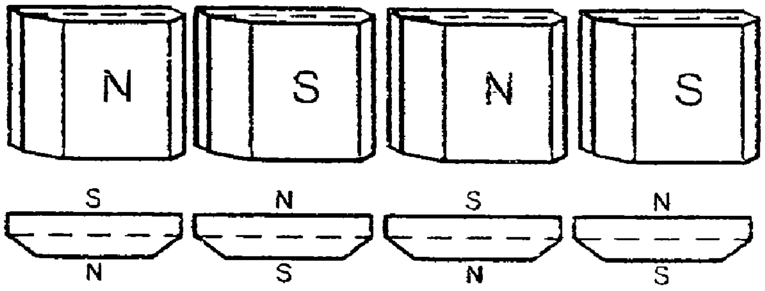
Figure 15E:
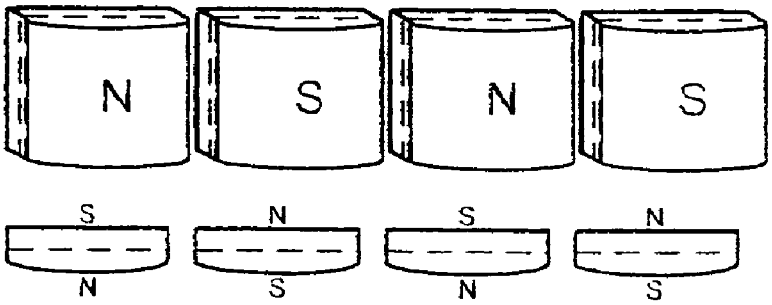

FIGS. 14$a$, 14$b$ and 14$c$ show different embodiments of inventive cogging force reducing flux conducting pole shoes 24, which, as pole shoes, can be directly attached to the coil cores 12 or may include the coil core 12 as such, but are formed opposite the individual magnets 1$a$, 1$b$, 1$c$, 1$d$ of the row of magnets and as flux conducting elements, as shown in FIG. 14$a$ in a sectional top view. The flux conducting pole shoes 24 are respectively formed such that the face, oriented towards the individual magnets 1$a$, 1$b$, 1$c$, 1$d$, realizes the most continuous transition from the magnetic field, generated by an individual coil 7, to the one of an adjacent individual coil 7. Obviously, the flux conducting elements 23 formed at the pole shoes 19, as shown in FIG. 12$b$, may have a corresponding shape. A soft-magnetic return flux rail 25, which assists in achieving a better closing of the magnetic field, is attached at the side of the coil cores 12 facing away from the individual magnets.

In FIG. 14$b$ diamond-shaped flux conducting pole shoes 24$a$ are shown in a front view, i.e. seen from the row of magnets. The diamond-shaped flux conducting pole shoes 24$a$, which are positively connected via a frontal face 30 of e.g. a round bar-shaped coil core 12, in this case, are respectively formed such that adjacent diamond-shaped flux conducting pole shoes 24$a$ are just not overlapping in driving direction i.e. in x-direction.

FIGS. 15$a$ to 15$e$ show different embodiments of inventive cogging force reducing individual magnets 1$a$, 1$b$, 1$c$, 1$d$ of the row of magnets. In FIG. 15$a$, simple rectangular individual magnets are shown, where no specific cogging force reducing measures are realized. FIG. 15$b$ shows skewed individual magnets, the edges thereof, extending in carrying direction (z-direction), being provided with a chamfer for reducing the cogging force, which chamfer is selected to obtain a hexagon in the top view. The chamfers of the magnets can be simultaneously used for positively connecting the magnets. FIG. 15$c$ shows arched individual magnets, the edges thereof extending in carrying direction (z-direction) being rounded for reducing the cogging force such that a regular oval is obtained in a top view. FIG. 15$d$ shows skewed individual magnets, the edges thereof extending in carrying direction (z-direction) and pointing to the coil cores 12 being provided with a chamfer according to FIG. 15$b$ for reducing the cogging force. This shape is preferred, if the coil cores 12 or flux conducting pole shoes 24, 24$a$-$c$ or flux conducting pole shoes 23 are only provided on one side of the magnets 1$a$, 1$b$, 1$c$, 1$d$, and the individual magnet is to be attached to the other side by bonding, or a carrying rail 2*a*, 2*b*, 2*d* is located there. FIG. 15*e* shows skewed individual magnets, the edges thereof, extending in carrying direction (z- direction) and pointing to the coil cores, being rounded for reducing the cogging force. This shape is likewise preferred, if the coil cores 12 or flux conducting pole shoes 24, 24*a-c*, or flux conducting pole shoes 23 are only provided on one side of the magnets 1*a*, 1*b*, 1*c*, 1*d*, and the individual magnet is to be attached to the other side by bonding, or a carrying rail 2*a*, 2*b*, 2*d* is located there.

FIGS. 16*a*, 16*b* and 16*c* show furthermore different embodiments of inventive cogging force reducing individual magnets 1*a*, 1*b*, ic, id of the row of magnets. In contrast to the shapes shown in FIGS. 15*a* to 15*e*, for reducing the cogging force, not only the edges extending in carrying direction, i.e. z-direction, are skewed or rounded, but in addition a second direction in space of the individual magnets is provided with a chamfer or a rounding, in order to reduce the cogging force. In FIG. 16*a*, seen from the coil cores 12, hexagonal individual magnets, which are formed in this case such that respective corners, pointing to an adjacent individual magnet and touching each other, have additional skewed edges extending in carrying direction (z-direction) provided with a chamfer, which is selected e.g. such as to obtain a hexagon when seen in a top view. In FIG. 16*b*, seen from the coil cores 12, round individual magnets are further arched such as to form an ellipsoid of rotation. In FIG. 16*c* seen from the coil cores 12, round individual magnets are only arched on one pole side according to FIG. 16*b*.

FIG. 17*a* shows a row of magnets with simple rectangular individual magnets 1*a*, 1*b*, 1*c*, 1*d* and a coil arrangement consisting of individual coils 7 with coil cores 12 and a soft-magnetic return flux rail 25, where no specific cogging force reducing measures are realized.

In a sectional top view FIG. 17*c* shows another embodiment of inventive cogging force reducing flux conducting pole shoes 24*d*, which represent the coil core 12 directly as pole shoes 19; however, they are directly opposite the individual magnets 1*a*, 1*b*, 1*c*, 1*d* of the row of magnets and formed as flux conducting elements. For reducing the cogging force, the flux conducting pole shoes 24*d* have rounded edges extending in carrying direction (z-direction) and pointing towards the row of magnets, wherein it is possible that the rounding extends in driving direction, i.e. x-direction, along half the flux conducting pole shoe 24*d*.

FIG. 17*b* shows an embodiment with flux conducting pole shoes 24*c*, in which elongated coil cores 12*d* protrude in the direction of the row of magnets 1*a*, 1*b*, 1*c*, 1*d*, the protruding part being respectively rounded such that a continuous transition is formed to the coils 7.

Figure 18:
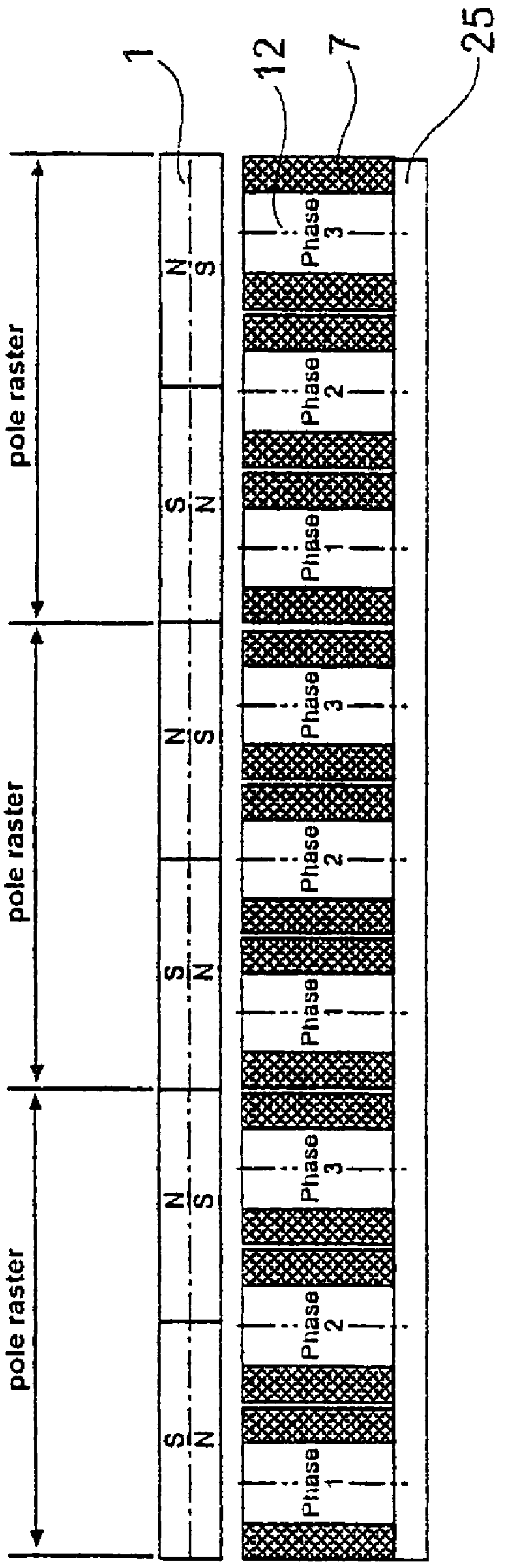
FIG. 18 shows an illustration of a preferred embodiment of an inventive row of magnets consisting of one magnet.

FIG. 18 shows a row of magnets 1, which consists of a multiple polarized magnet for reducing the cogging force, and a coil arrangement consisting of individual coils 7 with coil cores 12 and a soft-magnetic return flux rail 25. Having one or more multiple polarized individual magnets as a row of magnets offers the advantage of easier mounting and of smoother transitions between the individual poles, whereby an increased reduction of the cogging forces is achieved.

Figures 19A, 19B:
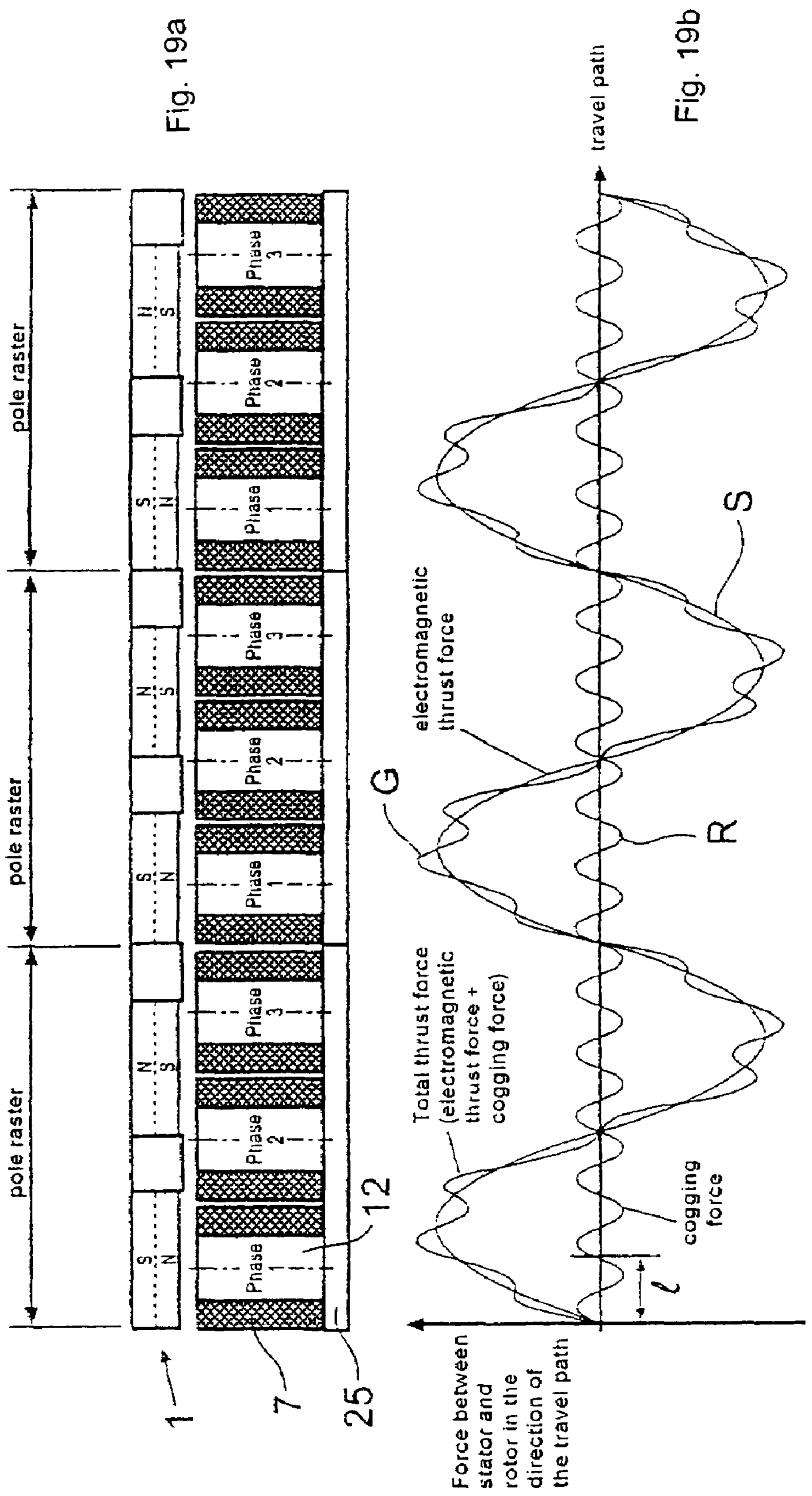
FIGS. 19*a* and 19*b* show a sectional illustration in a top view of a third preferred embodiment of the inventively, preferably used combined carrying and drive system with their cogging force and thrust force curves.

FIG. 19*a* shows three drive segments of a third preferred embodiment of the inventively, preferably used drive system in a sectional top view, wherein the inventively, preferably used magnetic linear drive has a three-phase coil arrangement, a row of magnets 1 being opposite one side of the coil cores 12, the other side thereof being connected to a soft-magnetic return flux rail 25. In this embodiment, the magnet raster $R_M$=3/2 of the coil raster $R_s$ is chosen, i.e. three driving coils 7, which are activated by a respective phase of the three-phase drive system, are assigned to two individual magnets of the row of magnets 1, which forms one pole raster. On account of these features, each coil bridges a phase angle of 120° and after 360° (one rotation=2 $R_M$) all three coils of a drive segment of the linear drive unit are passed through, where one drive segment consists of a number of jointly activated coils or pairs of coils in a number corresponding to the electrical phases.

The phase diagram of this arrangement corresponds to the one described above with regard to the arrangement of FIG. 13. The phase activation diagrams and explanations on the advance properties described in this context are applicable as well.

FIG. 19*b* shows the electromagnetic thrust forces to be achieved by the coils in a characteristic curve S, as well as the total thrust force superimposed by the cogging force along the travel path of the rotor in a characteristic curve G. It can be seen that the cogging force R has six times the frequency of the electromagnetic thrust force and about 15% of its amplitude. The wavelength of the cogging force R along the travel path is indicated by l.

Figure 20A:
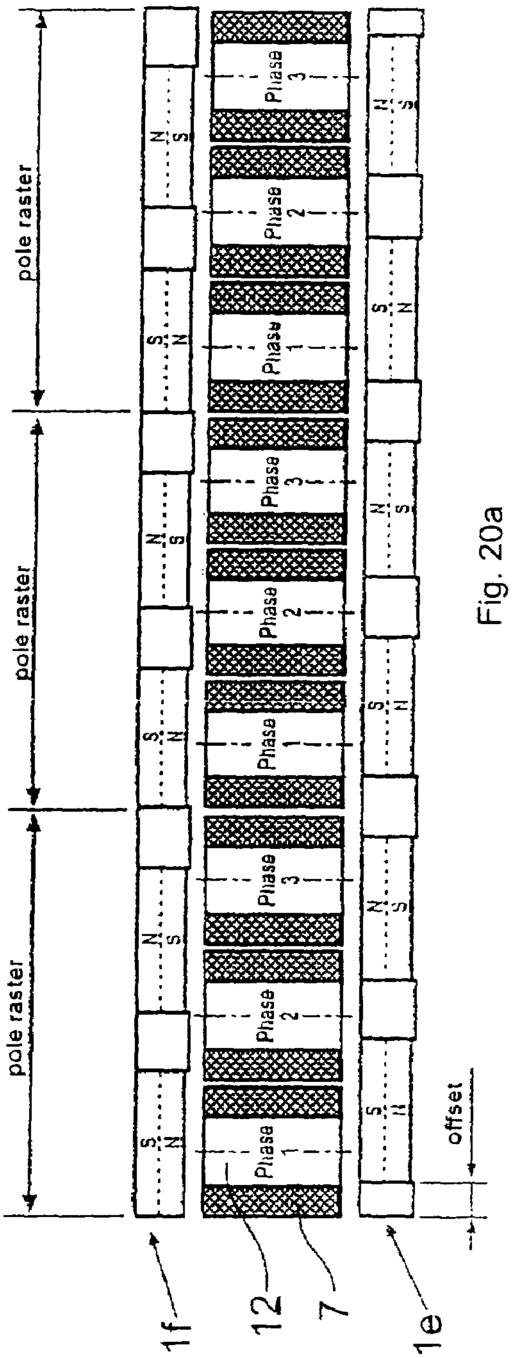
FIGS. 20*a* and 20*b* show a sectional illustration in a top view of a first preferred development of the inventively, preferably used combined carrying and drive system with their cogging force and thrust force curves according to the third preferred embodiment of the invention.
Figure 20B:
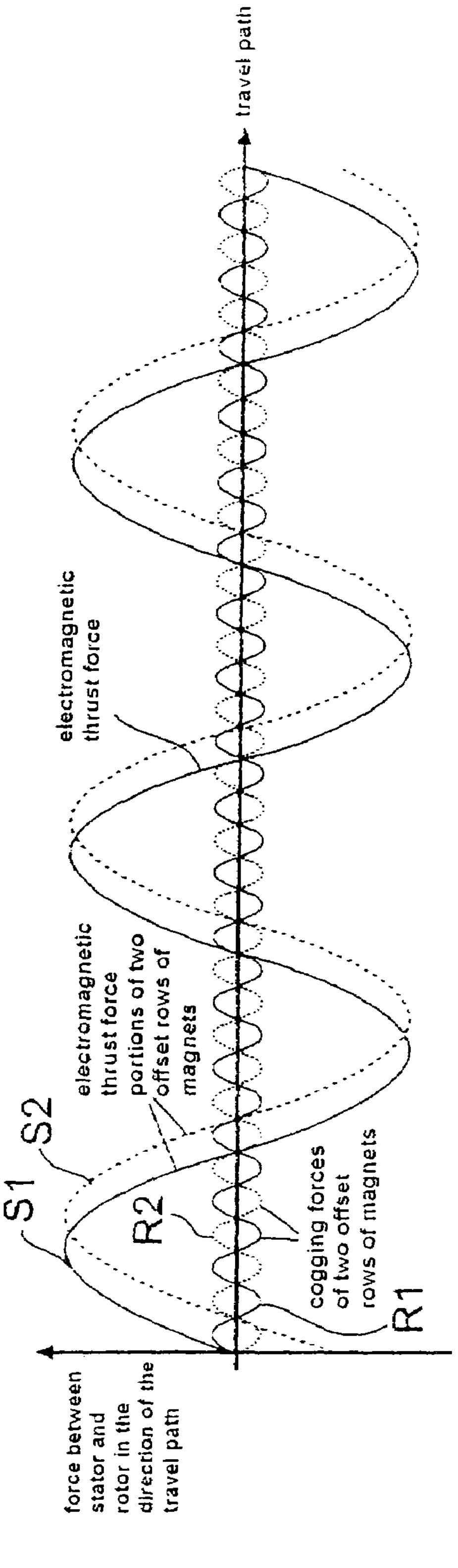

The inventive prevention of abrupt sign reversals of the total magnetization of the at least one row of magnets 1, 1*e*, 1*f* can be achieved with linear motor sliding door drives having two or more rows of permanent magnets, in that these rows of permanent magnets are disposed such as to be offset with regard to each other. Such a third preferred embodiment of an inventive sliding door with a linear drive unit is shown in FIG. 20*a*. In this case, the displacement for a linear drive unit with two rows of magnets le, if corresponds to a half wavelength 1 of the cogging force wave R. As the wavelength of the cogging force wave R is relatively short compared to the wavelength of the electromagnetic thrust force 5, the weakening of the thrust force, which is linked to such relatively small displacement of the rows of magnets 1*e*, 1*f* with regard to each other, is negligible. FIG. 20*b* shows curves R1 and R2 of the cogging forces of the two rows of magnets le, if offset with regard to each other and their electromagnetic thrust force portions S1, S2 as well. The curve of the cogging force wave R1 and of the electromagnetic thrust force S1 of the row of magnets 1*f* corresponds to the cogging force curve R and to the thrust force curve S of the row of magnets 1 shown in FIG. 19*b*, as the arrangement is identical here. The row of magnets le, offset by ½ l in driving direction with regard to the row of magnets 1*f*, has a correspondingly offset cogging force curve R2 and thrust force curve S2. As the two rows of magnets 1*e*, 1*f* are rigidly mounted towards each other, e.g. at the carrying slide 4, which is not shown in the Figure, the total cogging forces are obtained by adding up the cogging force curves R1, R2 of the two rows of magnets 1*e*, 1*f*, and the total thrust force is obtained by adding up the electromagnetic thrust force portions S1, S2 and the cogging forces R1, R2 of the two rows of magnets 1*e*, 1*f*. On account of the selected offset, a cancellation of the arising cogging forces occurs, if their curve is uniform along the travel path, e.g. sinusoidal, whereby the total thrust force is independent from the cogging forces. As most of the time the cogging forces are not ideally uniform, a residual portion remains, which however, is very reduced compared to an arrangement without offset.

If the drive arrangement has only one row of magnets 1, the same effect can be achieved by subdividing the row of magnets 1 in several sections, which are then offset relative to each other by a small amount with regard to each other. Such subdivision of several rows of magnets 1*e*, 1*f* and a relative displacing of sections towards each other may be useful and applicable as well in drives having several rows of permanent magnets.

Figure 21A:
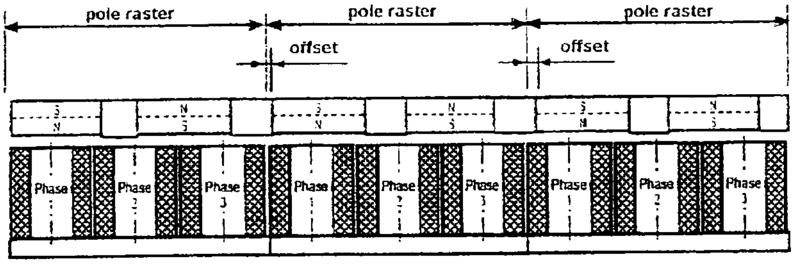
FIGS. 21*a*, 21*b* and 21*c* show a sectional illustration in a top view of a second preferred development of the inventively preferably used combined carrying and drive system with their cogging force and thrust force curves according to the third preferred embodiment of the invention.
Figure 21B:
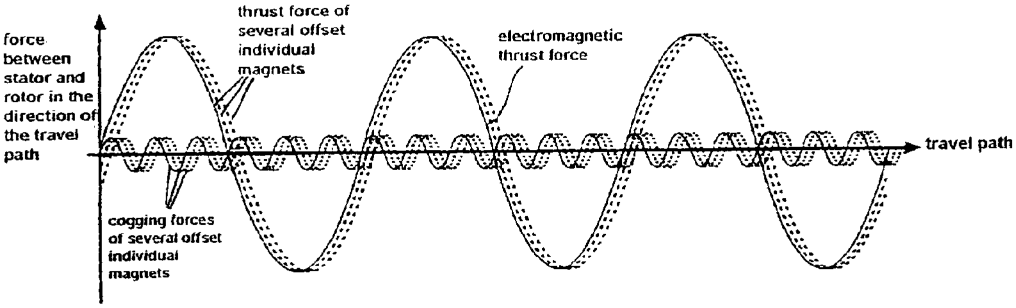
Figure 21C:
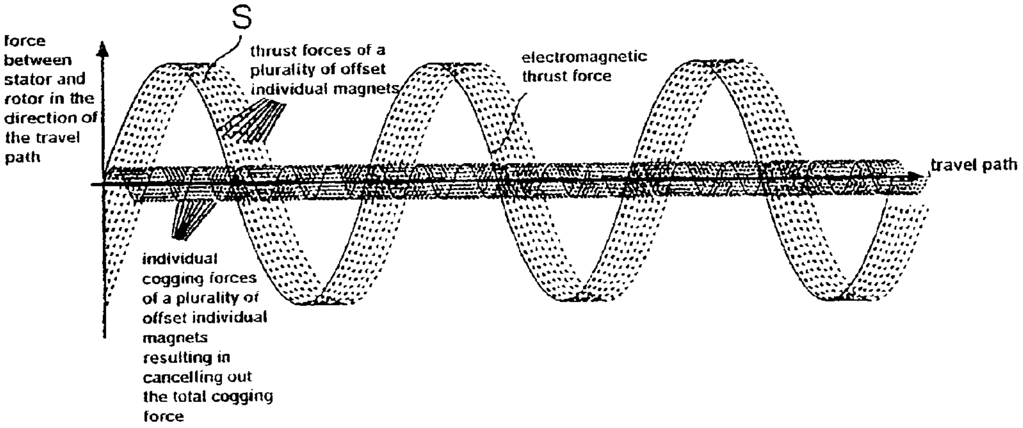

FIG. 21*a* shows an arrangement of a linear drive unit corresponding to the arrangement shown in FIG. 19, in which, according to a second development of the third inventively preferred embodiment, respective groups of two individual magnets are offset with regard to the initial position shown in FIG. 19*a*. This way, the arrangement is the same within one pole raster; however, the individual pole rasters are slightly offset towards each other. FIG. 21*b* shows corresponding cogging force portions of the three shown groups of magnets consisting respectively of two individual magnets, as well as their respective thrust force curve S. It can be seen that a strong resultant cogging force would still be present with the here selected small offset, which however, as indicated in FIG. 21*c*, would be cancelled out, similar to a superimposition of noise, by a greater number of groups of magnets being respectively offset with regard to each other. The total offset between the groups of magnets at maximum should correspond to the wavelength 1 of the individual cogging force curves, as is shown in FIG. 21*c* as well, such as not to have any negative interference with the total thrust force G.

The magnet sections may as well consist of respectively only one magnet such that each magnet is offset by a slightly different amount with regard to the basic raster shown in FIG. 19*b*, which is formed by the basic arrangement of magnets and coils or coil cores. Subdividing rows of magnets and the relative displacing of the sections may be useful and applicable as well in drives having several rows of permanent magnets, as already described above.

The relative displacement of individual magnets about a small amount with regard to the basic raster may be obtained for example by spacers, which are introduced between the magnets and are slightly larger or smaller than the distance the magnets have to respect to each other in order to correspond to the basic raster positions. As illustrated in FIG. 21, the best result is achieved, if the maximum relative displacement of magnets in a rotor with regard to the basic raster correspond to approximately one wavelength 1 of the cogging force. A similar effect is achieved, if the magnets have inaccurate distances corresponding to a stochastic distribution.

Figure 22A:
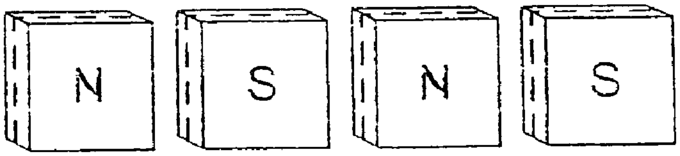
FIGS. 22*a* to 22*g* show shapes of preferably used magnets or rows of magnets according to the third preferred embodiment according to the invention.
Figure 22B:
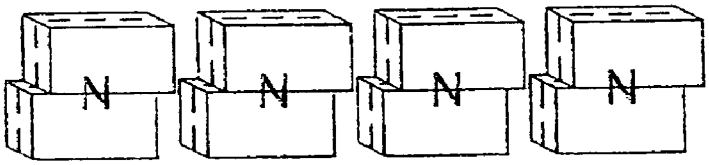
Figure 22C:
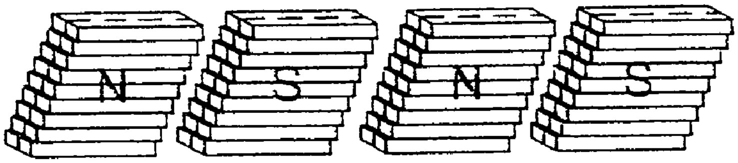
Figure 22D:
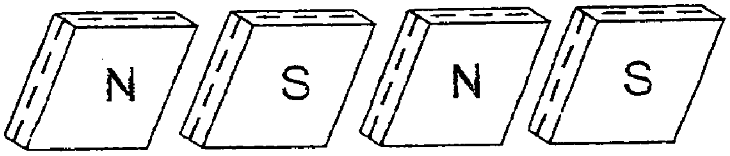
Figure 22E:
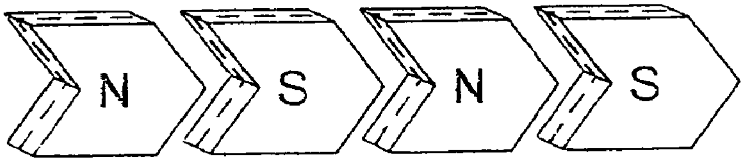
Figure 22F:
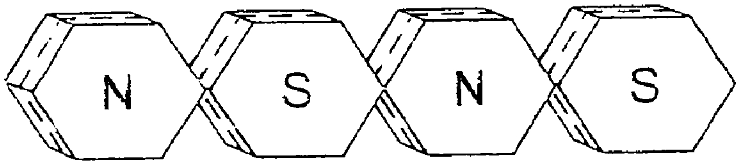
Figure 22G:
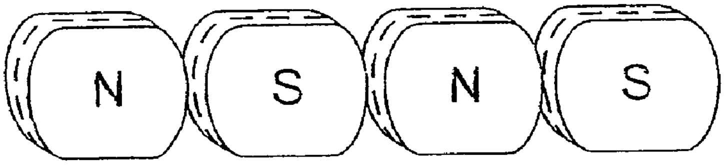

Instead of or in addition to the above described preferred embodiments of the inventive sliding door, the individual magnets may be skewed or have a specific shape, for reducing the cogging forces, which corresponds in principle to the method of superimposition and to the resulting complete or partial cancellation of offset curves of cogging force waves, because the skewing can be understood as a displacing of the magnetic layers, as diagrammatically shown in FIG. 22*a* to 22*c*, FIG. 22*a* showing an unskewed row of magnets, FIG. 22*b* showing magnets with two magnetic layers offset towards each other in driving direction, and FIG. 22*c* showing individual magnets having a plurality of magnetic layers offset towards each other. Therefore, the skewing may be understood as a displacing of an infinite number of magnetic layers. Correspondingly formed diamond-shaped individual magnets are shown in FIG. 22*d*. Magnets symmetrically skewed on both sides, as shown in FIG. 22*e*, which basically have an arrow shape, do not generate transverse ripple force. Magnets, which basically have the shape of a regular hexagon, the corners of adjacent magnets respectively abutting against each other, as shown in FIG. 22*f* will basically achieve the same effect as the individual magnets shown in FIG. 22*e;* however, they are easier to manufacture. A similar effect is obtained, if the individual magnets have rounded edges in driving direction, namely have a basically oval shape, as shown in FIG. 22*g*.

Obviously, the inventive sliding door with the inventive magnetic drive system may be configured such that the merely preferably magnetically supported carrying device is provided separate from the inventive drive system.

The above described cogging force reducing measures with respect to the Figures and in the general description of the inventive solution may be arbitrarily combined with each other.

LIST OF REFERENCES

1, 1*e*, 1*f* row of magnets
1*a-d* magnet
2 carrying element
2*a*, 2*b*, 2*d* carrying rail
3 guiding element
4 carrying slide
5 door leaf
6 housing
7, 7*a-c* coil
12, 12*a-d* coil core
18*a*, 18*b* pole shoe strip
19 pole shoes
21 sheet-metal mount
22 contacting and fastening pins
23 flux conducting elements
24, 24*a-c* flux conducting pole shoes
25 soft-magnetic return flux rail
26 bottom section
27 lateral walls
28 lateral walls
29 axes
30 side
R1, R2 cogging force curves
S1, S2 wave of the electromagnetic thrust force
G wave of the total thrust force
I wavelength
S characteristic curve (thrust forces)
R cogging force

What is claimed is:

1. A magnetic drive system for driving a door leaf in a driving direction, comprising:

a first row of magnets disposed in the driving direction and having a longitudinal direction, the magnets being arranged so that magnetization polarity of the magnets reverses at predetermined intervals in the longitudinal direction; and a coil arrangement comprising a plurality of coil cores and a plurality of coils, the coils being wound around respective coil cores and spaced apart from each other in the longitudinal direction of the row of magnets, the coil cores respective shoes, wherein when energized, the coils interact with the magnets to generate a thrust force for driving the door leaf in the driving direction, and wherein at least one of the pole shoes and the magnets are formed so that cogging force of the drive system is reduced.

2. The magnetic drive system of claim 1, wherein each magnet in the row of magnets comprises a hard magnetic element, a permanent magnet, or a high energy magnet.

3. The magnetic drive system of claim 1, further comprising:

at least one of a magnetic carrying element carrying the row of magnets; and a guiding element for maintaining a predetermined distance between the magnets and at least one of the magnetic carrying element and the coil arrangement, wherein the magnetic carrying element and the magnets interact to generate a magnetic supporting force for the door leaf.

4. The drive system of claim 1, wherein the cogging force is reduced in that each magnet in the row of magnets has one of a chamfer, an arched surface and a skew.

5. The drive system of claim 1, wherein the cogging force is reduced in that each magnet in the row of magnets has edges and an irregular magnetization which weakens toward the edges.

6. The drive system of claim 1, the cogging force is reduced in that the drive system further comprises a second row of magnets disposed in the driving direction, wherein the two rows of magnets are offset relative to each other in the driving direction.

7. The drive system of claim 1, wherein the cogging force is reduced in that the magnets in the row of magnets are spaced apart from each other so that a distance between every two adjacent magnets is not constant.

8. The drive system of claim 1, wherein the cogging force is reduced in that each coil has a lateral pole shoe for conducting an electromagnetic field generated by said each coil to the magnets, each lateral pole shoe having a face which faces the magnets and is arched or has a chamfer, the faces being disposed in one row.

9. The drive system of claim 1, wherein the cogging force is reduced in that each coil core has a surface which faces the magnets and is arched or has a chamfer, the surfaces being disposed in one row.

10. The drive system of claim 1, wherein the cogging force is reduced in that each coil core has a surface which faces the magnets, the surfaces being disposed in one row, the coil arrangement further comprises a plurality of flux conducting elements which are mounted on the respective surfaces of the coil cores each said flux conducting element overlapping two adjacent said coils.

11. The drive system of claim 10, wherein the cogging force is reduced in that each said flux conducting element is skewed, rounded, arched or has a chamfer.

12. The drive system of claim 1, wherein the cogging force is reduced in that the coil arrangement comprises "x "coils which are energized by a rotary current with "n " electrical phases, the row of magnets comprising "y "magnets which are regularly distributed and have "p " magnetic poles, wherein n=x=3, and p=y=4, or
n=x=5, and p=y=4, or
n=x=5, and p=y=6, or
n=x=5, and p=y=8, or
n=x=6, and p=y=4, or
n=x=8, and p=y=10.

13. The drive system of claim 1, wherein the cogging force is reduced in that each coil core has a round shaped cross section having a diameter which is greater than a height of each magnet.

14. The drive system of claim 1, wherein the cogging force is reduced in that each coil core has a rectangular shaped or square shaped cross section.

15. The drive system of claim 14, wherein the cogging force is reduced in that each coil core has edges which are provided with a rounding or a chamfer.

16. The drive system of claim 1, wherein the cogging force is reduced in that each coil core has a cross section composed of a rectangular section and two semicircle sections extending outward from respective sides of the rectangular section.

17. The sliding door of claim 1, wherein the cogging force is reduced in that each coil core has an oval shaped cross section.

18. The drive system of claim 1, wherein each magnet in the row of magnets is magnetized perpendicularly to the driving direction.

19. The drive system of claim 3, wherein the magnets are arranged so that magnetization polarity of the magnets reverses at predetermined intervals in the longitudinal direction.

20. The drive system of claim3, wherein the magnetic carrying element is formed by a row of spaced, soft magnetic elements.

21. The drive system of claim 3, wherein the magnetic carrying element comprises two magnetic carrying rails disposed on respective sides of the row of magnets.

22. The drive system of claim 3, wherein the magnetic carrying element comprises a U-shaped carrying rail having two lateral sections and a bottom section connecting the two lateral sections, the row of magnets being at least partially guided in the U-shaped carrying rail so that an inner surface of one of the lateral sections is spaced from a first side of the row of magnets with an inner surface of the other of the lateral sections being spaced from an opposite, second side of the row of magnets.

23. The drive system of claim 3, wherein the magnetic carrying element is stationary and the row of magnets is non-stationary.

24. The drive system of claim 3, wherein the magnetic carrying element comprises a soft magnetic element.

25. The drive system of claim 3, wherein the guiding element comprises a sliding member.

26. The drive system of claim 2, wherein the coil arrangement is stationary and the row of magnets is non-stationary.

27. The drive system of claim 2, wherein the magnetization polarity of the magnets reverses so that every two adjacent magnets have different polarities facing the coil arrangement.

28. The drive system of claim 2, wherein the magnetization polarity of the magnets reverses irregularly in the driving direction, the coils being spaced apart from each other so that a distance between every two adjacent coils is constant.

29. The drive system of claim 2, wherein each magnet in the row of magnets has a skewed shape or is mounted skewedly with respect to the driving direction.

30. The drive system of claim 6, wherein magnetization polarities of the two rows of magnets, magnetization polarities of two adjacent groups of adjacent magnets of one of the two rows of magnets, or magnetization polarities of two adjacent magnets of one of the two rows of magnets are offset with each other with respect to the coils.

31. The drive system of claim 30, wherein the magnetization polarities of the two rows of magnets are offset by ½ "l" with respect to the coils, wherein "l" is one wavelength of a cogging force arising of one of the two rows of magnets in the driving direction.

32. The drive system of claim 30, wherein the magnetization polarities of two adjacent groups of magnets of one of the two rows of magnets are offset with each other by ½ "l " with respect to the coils, wherein "l " is one wavelength of a cogging force arising of one of the two adjacent groups in the driving direction.

33. The drive system of claim 30, wherein the magnets in the row of magnets are alternatingly polarized in the driving direction, two adjacent magnets or two adjacent groups of at least two adjacent magnets being offset with each other with respect to the coils, a maximum of the offset being "l", wherein "l" is one wavelength of a cogging force which is generated when the two adjacent magnets or the two adjacent groups of at least two adjacent magnets are not offset with each other.

34. A sliding door system comprising:

a housing;

a door leaf guided in the housing and movable in a driving direction;

a row of magnets supported by one of the door leaf and the housing, the row of magnets being disposed in the driving direction and having a longitudinal direction, the magnets being arranged so that magnetization polarity of the magnets reverses at predetermined intervals in the longitudinal direction; and a coil arrangement supported by the other of the door leaf and the housing, the coil arrangement comprising a plurality of coil cores and a plurality of coils, the coils being wound around respective coil cores and spaced apart from each other in the longitudinal direction of the row of magnets, the coil cores having respective pole shoes.

wherein when energized, the coils interact with the magnets to generate a thrust force for driving the door leaf in the driving direction, wherein at least one of the pole shoes and the magnets are formed so that cogging force of the drive system is reduced, and wherein the sliding door is formed as an arched sliding door or as a horizontal sliding wall.

35. A magnetic drive system for driving a door leaf in a driving direction, comprising:

a plurality "y" of magnets with "p" magnetic poles disposed in the driving direction in at least one row having a longitudinal direction, the magnets being arranged so that magnetization polarity of the magnets reverses at predetermined intervals in the longitudinal direction; and a coil arrangement comprising a plurality of coil cores and a plurality "x " of coils which are energized by a rotary current with "n" electrical phases, the coils being wound around respective coil cores and spaced apart from each other in the longitudinal direction of the row of magnets, wherein, when energized, the coils interact with the magnets to generate a thrust force for driving the door leaf in the driving direction, and wherein the magnets in the row of magnets are disposed relative to the coil cores so that the magnets as a whole have no abrupt polarity reversals in the driving direction with respect to the coil cores, and wherein $n=x=3$, and $p=y=4$, or $n=x=5$, and $p=y=4$, or $n=x=5$, and $p=y=6$, or $n=x=5$, and $p=y=8$, or $n=x=6$, and $p=y=4$, or $n=x=8$, and $p=y=10$.

* * * * *